(12) United States Patent
Abe

(10) Patent No.: US 8,560,317 B2
(45) Date of Patent: Oct. 15, 2013

(54) VOICE RECOGNITION APPARATUS AND RECORDING MEDIUM STORING VOICE RECOGNITION PROGRAM

(75) Inventor: Kenji Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1216 days.

(21) Appl. No.: 11/522,422

(22) Filed: Sep. 18, 2006

(65) Prior Publication Data

US 2007/0271097 A1    Nov. 22, 2007

(30) Foreign Application Priority Data

May 18, 2006    (JP) .................................. 2006-139070

(51) Int. Cl.
*G01L 15/04*    (2013.01)

(52) U.S. Cl.
USPC ........... 704/251; 704/275; 704/276; 704/266; 704/257; 704/258

(58) Field of Classification Search
USPC ......... 704/255, 257, 249, 251, 236, 225, 233, 704/256, 240; 707/3
See application file for complete search history.

(56) References Cited

U.S. PATENT DOCUMENTS

| | | | | |
|---|---|---|---|---|
| 4,748,670 | A * | 5/1988 | Bahl et al. .................. | 704/256.1 |
| 5,127,055 | A * | 6/1992 | Larkey .......................... | 704/244 |
| 5,355,433 | A | 10/1994 | Yasuda et al. ................ | 395/2.52 |
| 5,774,841 | A * | 6/1998 | Salazar et al. ................ | 704/225 |
| 5,797,123 | A * | 8/1998 | Chou et al. .................. | 704/256.5 |
| 5,899,972 | A * | 5/1999 | Miyazawa et al. ............ | 704/249 |
| 6,018,708 | A * | 1/2000 | Dahan et al. .................. | 704/244 |

(Continued)

FOREIGN PATENT DOCUMENTS

| | | |
|---|---|---|
| DE | 4109785 A1 | 10/1991 |
| DE | 19624988 A1 | 1/1998 |

(Continued)

OTHER PUBLICATIONS

German Office Action dated May 12, 2010 with its partial English translation. Japanese Office Action dated Nov. 11, 2010 (in Japanese).

*Primary Examiner* — Douglas Godbold
*Assistant Examiner* — Mark Villena
(74) *Attorney, Agent, or Firm* — Kratz, Quintos & Hanson, LLP

(57) ABSTRACT

A vocabulary dictionary storing unit for storing a plurality of words in advance, a vocabulary dictionary managing unit for extracting recognition target words, a matching unit for calculating a degree of matching with the recognition target words based on an accepted voice, a result output unit for outputting, as a recognition result, a word having a best score from a result of calculating the degree of matching, and an extraction criterion information managing unit for changing extraction criterion information according to a result of monitoring by a monitor control unit are provided. The vocabulary dictionary storing unit further includes a scale information storing unit for storing scale information serving as a scale at the time of extracting the recognition target words, and an extraction criterion information storing unit for storing extraction criterion information indicating a criterion of the recognition target words at the time of extracting the recognition target words. With the change in the extraction criterion information, the vocabulary dictionary managing unit increases or decreases the number of the recognition target words. This makes it possible to improve a recognition performance without the need for a user to carry out a troublesome operation.

12 Claims, 15 Drawing Sheets

(56) References Cited

U.S. PATENT DOCUMENTS

| | | | | |
|---|---|---|---|---|
| 6,076,061 | A | 6/2000 | Kawasaki et al. | 704/270 |
| 6,708,150 | B1* | 3/2004 | Hirayama et al. | 704/243 |
| 6,868,381 | B1* | 3/2005 | Peters et al. | 704/249 |
| 6,985,862 | B2* | 1/2006 | Strom et al. | 704/255 |
| 7,206,389 | B1* | 4/2007 | Dumoulin et al. | 379/88.04 |
| 7,925,507 | B2* | 4/2011 | Weng et al. | 704/257 |
| 2002/0087311 | A1* | 7/2002 | Leung Lee et al. | 704/251 |
| 2002/0087325 | A1* | 7/2002 | Lee et al. | 704/270.1 |
| 2003/0172075 | A1* | 9/2003 | Reisman | 707/10 |
| 2005/0182558 | A1* | 8/2005 | Maruta | 701/200 |
| 2006/0106604 | A1* | 5/2006 | Okimoto | 704/243 |
| 2006/0206471 | A1* | 9/2006 | Tsuzuki et al. | 707/3 |

FOREIGN PATENT DOCUMENTS

| | | |
|---|---|---|
| DE | 69524829 T2 | 6/2002 |
| EP | 1193959 A2 | 4/2002 |
| JP | 57-66498 | 4/1982 |
| JP | 5-61800 | 8/1993 |
| JP | 6-332493 | 12/1994 |
| JP | 7-219590 | 8/1995 |
| JP | 9-26799 | 1/1997 |
| JP | 10-3296 | 1/1998 |
| JP | 2000-259180 | 9/2000 |
| JP | 2001-242885 | 9/2001 |
| JP | 2001-282284 | 10/2001 |
| JP | 2002-279350 | 9/2002 |
| JP | 2005-227545 | 8/2005 |

* cited by examiner

VOICE RECOGNITION APPARATUS AND RECORDING MEDIUM STORING VOICE RECOGNITION PROGRAM

BACKGROUND OF THE INVENTION

1. Field of the Invention

The present invention relates to a voice recognition apparatus and a recording medium storing a voice recognition program. In particular, the present invention relates to a voice recognition apparatus and a recording medium storing a voice recognition program that extract recognition target words, which are targeted for recognition, from a plurality of words stored in a vocabulary dictionary storing unit and perform a matching processing using the extracted recognition target words.

2. Description of Related Art

Conventionally, as a means of accepting an input from a user, a voice recognition apparatus that utilizes a voice recognition engine so as to recognize a speech (a voice) of a user and accept it as an input to a system has been known. Such a voice recognition apparatus has already been commercialized in, for example, information delivery systems including a voice portal and a car navigation system.

With the expanding variety of functions (increasing number of functions) of such information delivery systems, the vocabulary targeted for recognition tends to enlarge in the information delivery systems. For example, in the case where the voice recognition apparatus is mounted in a car navigation system, the vocabulary targeted for recognition includes individual functions of operations, and the names of places and facilities throughout the country. Thus, the vocabulary targeted for recognition is huge. It is very difficult to store a huge vocabulary in a vocabulary dictionary storing unit and recognize a user's speech properly and efficiently from the vocabulary in the vocabulary dictionary storing unit.

Now, in the information delivery systems with increasing number of functions, in many cases, only part of the entire functions are actually used by users. Taking note of this fact, JP 5-61800 U discloses a technology of automatically deleting words that are stored in a vocabulary dictionary storing unit and used with a low frequency. More specifically, an erasing control unit of a voice recognition apparatus monitors whether words stored in the vocabulary dictionary storing unit are used for recognition within a count period of a timer. Then, the erasing control unit deletes the words that are not used for recognition at all within a predetermined period. This makes it possible to recognize a user's speech properly and efficiently from the vocabulary in the vocabulary dictionary storing unit.

Also, JP 9-26799 A discloses a technology of deleting words that are stored in a vocabulary dictionary storing unit and used with a low frequency. JP 9-26799 A discloses a configuration of mounting a voice recognition apparatus in a car navigation system.

However, the configurations disclosed in JP 5-61800 U and JP 9-26799 A mentioned above have the following problem. When a user uses the deleted word, for example, even when the user utters that deleted word, the voice recognition apparatus cannot recognize it because this word is already deleted from the vocabulary dictionary storing unit.

In order to solve this problem, JP 2000-259180 A discloses a technology of deleting words that are stored in a vocabulary dictionary storing unit and used with a low frequency and storing the deleted words into the vocabulary dictionary storing unit again. More specifically, a list of the deleted words is displayed on a display screen, and a user selects words to be stored in the vocabulary dictionary storing unit from among the deleted words. Then, the selected words are stored into the vocabulary dictionary storing unit again. In this manner, even when a word is once deleted and then the need to target this word for recognition arises later, it is possible to store the deleted word into the vocabulary dictionary storing unit easily.

SUMMARY OF THE INVENTION

However, even with the configuration disclosed in JP 2000-259180 A described above, the following problems arise.

JP 2000-259180 A has the configuration in which the list of the deleted words is displayed on the display screen, and a user selects words to be stored in the vocabulary dictionary storing unit. Accordingly, the user needs to both grasp the words to be stored in the vocabulary dictionary storing unit and select the words to be stored in the vocabulary dictionary storing unit from the displayed list. This causes a problem in that the user has to carry out a troublesome operation.

Further, when the words to be stored in the vocabulary dictionary storing unit are selected from the displayed list, there is no longer an advantage of achieving so-called eyes-free operation (not using eyes) and hands-free operation (not using hands) in the voice recognition apparatus.

With the foregoing problems in mind, it is an object of the present invention to provide a voice recognition apparatus and a recording medium storing a voice recognition program in which a recognition performance improves without the need for a user to carry out a troublesome operation.

In order to achieve the above-mentioned object, a voice recognition apparatus according to the present invention includes a voice input unit for converting an accepted voice into digital voice data, a voice analyzing unit for converting the digital voice data into a feature value, a vocabulary dictionary storing unit for storing a plurality of words in advance, a vocabulary dictionary managing unit for extracting recognition target words, which are targeted for recognition, from the plurality of words stored in the vocabulary dictionary storing unit, a matching unit for calculating a degree of matching with the recognition target words extracted by the vocabulary dictionary managing unit using the feature value converted by the voice analyzing unit, and a result output unit for outputting, as a recognition result, a word having a best score from a result of calculating the degree of matching by the matching unit. The voice recognition apparatus includes a scale information storing unit for storing in advance scale information serving as a scale for extracting the recognition target words for each of the plurality of words stored in the vocabulary dictionary storing unit, an extraction criterion information storing unit for storing in advance extraction criterion information indicating a criterion of the scale information at the time of extracting the recognition target words, a monitor control unit for monitoring predetermined states, and an extraction criterion information managing unit for changing the extraction criterion information stored in the extraction criterion information storing unit according to a result of the monitoring by the monitor control unit. With the change in the extraction criterion information, the vocabulary dictionary managing unit increases or decreases the number of the recognition target words to be extracted from the plurality of words stored in the vocabulary dictionary storing unit.

According to the voice recognition apparatus according to the present invention, with the change in the extraction criterion information indicating the criterion of the scale information at the time of extracting the recognition target words, the vocabulary dictionary managing unit increases or decreases the number of the recognition target words to be extracted from the plurality of words stored in the vocabulary dictionary storing unit. Thus, when the extraction criterion information is changed according to the result of monitoring by the monitor control unit, the vocabulary dictionary managing unit increases or decreases the number of the recognition target words to be extracted from the plurality of words stored in the vocabulary dictionary storing unit. In the case where the vocabulary dictionary managing unit increases the number of the recognition target words, the matching unit performs the matching processing according to the recognition target words increased in number. Therefore, the number of the recognition target words in the voice recognition apparatus increases, thereby improving the degree of freedom of a speech. In the case where the vocabulary dictionary managing unit decreases the number of recognition target words, the matching unit performs the matching processing according to the recognition target words decreased in number. Therefore, the number of the recognition target words in the voice recognition apparatus is restricted, thereby improving a recognition rate and a recognition speed. As a result, it is possible to achieve the voice recognition apparatus in which a recognition performance improves without the need for a user to carry out a troublesome operation.

In the above-described voice recognition apparatus according to the present invention, it is preferable that the monitor control unit monitors at least one monitor target from a processing state of an operation accepted from a user, a processing state of the voice accepted from the user and a predetermined time passed from a measurement unit for measuring a time, the vocabulary dictionary managing unit increases or decreases the number of the recognition target words to be extracted from the plurality of words stored in the vocabulary dictionary storing unit according to the changed extraction criterion information, and the matching unit calculates the degree of matching with the recognition target words increased or decreased in number using the feature value converted by the voice analyzing unit.

With this configuration, the monitor control unit monitors at least one monitor target from the processing state of the operation accepted from the user, the processing state of the voice accepted from the user and the predetermined time passed from the measurement unit for measuring the time. The vocabulary dictionary managing unit increases or decreases the number of the recognition target words to be extracted from the plurality of words stored in the vocabulary dictionary storing unit according to the changed extraction criterion information. In the case where the vocabulary dictionary managing unit increases the number of the recognition target words, the matching unit performs the matching processing according to the recognition target words increased in number. Therefore, the number of the recognition target words in the voice recognition apparatus increases, thereby improving the degree of freedom of a speech. In the case where the vocabulary dictionary managing unit decreases the number of recognition target words, the matching unit performs the matching processing according to the recognition target words decreased in number. Therefore, the number of the recognition target words in the voice recognition apparatus is restricted, thereby improving the recognition rate and the recognition speed. As a result, it is possible to achieve the voice recognition apparatus in which the recognition performance improves without the need for a user to carry out a troublesome operation.

In the above-described voice recognition apparatus according to the present invention, it is preferable that the monitor control unit monitors at least one monitor target from (a) to (h) below, that when the monitor control unit detects a state of (a) to (d) below, it transmits a first updating signal to the extraction criterion information managing unit, and the extraction criterion information managing unit changes the extraction criterion information stored in the extraction criterion information storing unit based on the first updating signal so that the number of the recognition target words to be extracted from the plurality of words stored in the vocabulary dictionary storing unit increases, and that after transmitting the first updating signal to the extraction criterion information managing unit, when the monitor control unit detects a state of (e) to (h) below, it transmits a second updating signal to the extraction criterion information managing unit, and the extraction criterion information managing unit changes the extraction criterion information stored in the extraction criterion information storing unit based on the second updating signal so that the number of the recognition target words to be extracted from the plurality of words stored in the vocabulary dictionary storing unit decreases.

(a) in a case where the recognition result cannot be obtained (b) in a case where the user conducts an operation or makes a speech so as to modify or correct an operation or a speech immediately before it (c) in a case where the user does not conduct a confirmation operation even after a predetermined period despite a fact that the confirmation operation of a processing is necessary (d) in a case where no operation is conducted or no speech is made for a predetermined period (e) in a case where the matching unit calculates the degree of matching predetermined times, (f) in a case where a predetermined time is passed, (g) in a case where the user conducts a confirmation operation within a predetermined period when the confirmation operation of the processing is necessary (h) in a case where the user does not conduct the operation or does not make the speech so as to modify or correct the operation or the speech immediately before it With this configuration, when the monitor control unit detects the state of (a) to (d) described above, it transmits the first updating signal to the extraction criterion information managing unit. The extraction criterion information managing unit changes the extraction criterion information based on the first updating signal so that the number of the recognition target words to be extracted from the plurality of words stored in the vocabulary dictionary storing unit increases. Thus, the vocabulary dictionary managing unit increases the number of recognition target words according to the changed extraction criterion information. Therefore, the number of the recognition target words in the voice recognition apparatus increases, thereby improving the degree of freedom of a speech. Also, after transmitting the first updating signal to the extraction criterion information managing unit, when the monitor control unit detects the state of (e) to (h) described above, it transmits the second updating signal to the extraction criterion information managing unit. The extraction criterion information managing unit changes the extraction criterion information based on the second updating signal so that the number of the recognition target words to be extracted from the plurality of words stored in the vocabulary dictionary storing unit decreases. Thus, the vocabulary dictionary managing unit decreases the number of recognition target words according to the changed extraction criterion information. Therefore, the number of the recognition target words in the voice recognition apparatus is restricted, thereby improving the recognition rate and the recognition speed. As a result, it is possible to achieve the voice recognition apparatus in which the recognition performance improves without the need for a user to carry out a troublesome operation.

In the above-described voice recognition apparatus according to the present invention, it is preferable that the vocabulary dictionary managing unit selectively performs one of operations (1) and (2) below according to the extraction criterion information stored in the extraction criterion information storing unit.

(1) the vocabulary dictionary managing unit extracts the recognition target words based on the scale information (2) the vocabulary dictionary managing unit extracts all the words stored in the vocabulary dictionary storing unit as the recognition target words regardless of the scale information With this configuration, according to the extraction criterion information, the vocabulary dictionary managing unit selectively performs either of the operations (1) extracting the recognition target words based on the scale information and (2) extracting all the words as the recognition target words regardless of the scale information. Thus, the extraction criterion information is changed according to the state of the processing accepted from the user, for example. The vocabulary dictionary managing unit selectively performs either of the operations (1) and (2) described above according to the extraction criterion information. In the case where the vocabulary dictionary managing unit performs the operation (1), the matching unit performs the matching processing according to the extracted recognition target words based on the scale information. Therefore, the number of the recognition target words in the voice recognition apparatus is restricted, thereby improving the recognition rate and the recognition speed. In the case where the vocabulary dictionary managing unit performs the operation (2), the matching unit performs the matching processing according to the recognition target words targeting for recognition all the words stored in the vocabulary dictionary storing unit. Therefore, the number of the recognition target words in the voice recognition apparatus increases, thereby improving the degree of freedom of a speech. As a result, it is possible to achieve the voice recognition apparatus in which the recognition performance improves without the need for a user to carry out a troublesome operation.

In the above-described voice recognition apparatus according to the present invention, it is preferable to further include a use frequency managing unit for monitoring the number of uses of each of the plurality of words stored in the vocabulary dictionary storing unit and calculating a use frequency of each of the plurality of words, a use frequency storing unit for storing, as use frequency data, the use frequency calculated by the use frequency managing unit so as to correspond to each of the plurality of words stored in the vocabulary dictionary storing unit, and a scale information managing unit for updating the scale information stored in the scale information storing unit using at least the use frequency data stored in the use frequency storing unit.

With this configuration, the scale information managing unit updates the scale information using at least the use frequency data. Thus, for example, in the case where the recognition target words are extracted based on the scale information, the vocabulary dictionary managing unit can extract words used with a high frequency as the recognition target words and exclude words used with a low frequency from recognition targets. Therefore, the recognition rate of the voice recognition apparatus improves. As a result, it is possible to achieve the voice recognition apparatus in which the recognition performance improves without the need for a user to carry out a troublesome operation.

In the above-described voice recognition apparatus according to the present invention, it is preferable to further include a vocabulary group use frequency managing unit for dividing the plurality of words stored in the vocabulary dictionary storing unit into a plurality of vocabulary groups and calculating a use frequency of each of the vocabulary groups based on the use frequency of each of the plurality of words belonging to the vocabulary group stored in the vocabulary dictionary storing unit, a vocabulary group use frequency storing unit for storing, as vocabulary group use frequency data, the use frequency of the vocabulary group calculated by the vocabulary group use frequency managing unit so as to correspond to each of the vocabulary groups, and a threshold storing unit for storing a threshold indicating a criterion of the vocabulary group use frequency data at the time of extracting the recognition target words, and it is preferable that the vocabulary dictionary managing unit selectively performs one of operations (3) and (4) below referring to the threshold stored in the threshold storing unit and the vocabulary group use frequency data stored in the vocabulary group use frequency storing unit according to the extraction criterion information stored in the extraction criterion information storing unit.

(3) for the vocabulary group whose vocabulary group use frequency data are equal to or larger than the threshold, the vocabulary dictionary managing unit extracts all the words belonging to this vocabulary group as the recognition target words regardless of the scale information (4) for the vocabulary group whose vocabulary group use frequency data are smaller than the threshold, the vocabulary dictionary managing unit extracts the recognition target words from the words belonging to this vocabulary group based on the scale information With this configuration, referring to the threshold and the vocabulary group use frequency data, the vocabulary dictionary managing unit selectively performs one of operations (3) for the vocabulary group whose vocabulary group use frequency data are equal to or larger than the threshold, extracting all the words belonging to this vocabulary group as the recognition target words regardless of the scale information and (4) for the vocabulary group whose vocabulary group use frequency data are smaller than the threshold, extracting the recognition target words from the words belonging to this vocabulary group based on the scale information. Thus, in the case where the vocabulary dictionary managing unit performs the operation (3) described above for the vocabulary group whose vocabulary group use frequency data are equal to or larger than the threshold, the matching unit performs the matching processing according to the recognition target words targeting for recognition all the words belonging to this vocabulary group. Therefore, since all the words belonging to the vocabulary groups used with a high frequency are targeted for recognition, for example, the number of the recognition target words in the voice recognition apparatus for these vocabulary groups increases, thereby improving the degree of freedom of a speech. In the case where the vocabulary dictionary managing unit performs the operation (4) described above for the vocabulary group whose vocabulary group use frequency data are smaller than the threshold, the matching unit performs the matching processing according to the recognition target words extracted from the words belonging to that vocabulary group based on the scale information. Therefore, since the words belonging to the vocabulary groups used with a low frequency are recognition target words extracted based on the scale information, for example, the number of the recognition target words in the voice recognition apparatus for these vocabulary groups is restricted, thereby improving the recognition rate and the recognition speed. As a result, it is possible to achieve the voice recognition apparatus in which the recognition performance improves without the need for a user to carry out a troublesome operation.

In the above-described voice recognition apparatus according to the present invention, it is preferable that the monitor control unit monitors at least one monitor target from a processing state of an operation accepted from a user, a processing state of the voice accepted from the user and a predetermined time passed from a measurement unit for measuring a time, the voice recognition apparatus further includes a threshold managing unit for updating the threshold stored in the threshold storing unit according to the result of the monitoring by the monitor control unit, and the vocabulary dictionary managing unit selectively performs one of the operations (3) and (4) above according to the updated threshold. With this configuration, the threshold managing unit updates the threshold according to the result of the monitoring by the monitor control unit. For example, when the recognition result is not obtained or the user's operation comes to a dead end, the threshold managing unit updates the threshold so as to become smaller. Consequently, for example, the vocabulary dictionary managing unit can change the operation (4) performed for the vocabulary group to the operation (3). Therefore, the number of the recognition target words in the voice recognition apparatus increases, thereby improving the degree of freedom of a speech. As a result, it is possible to achieve the voice recognition apparatus in which the recognition performance improves without the need for a user to carry out a troublesome operation.

In the above-described voice recognition apparatus according to the present invention, it is preferable to further include a voice storing unit for storing the digital voice data converted by the voice input unit or the feature value converted by the voice analyzing unit, and that the matching unit calculates the degree of matching with the recognition target words extracted by the vocabulary dictionary managing unit using the digital voice data or the feature value stored in the voice storing unit. With this configuration, the matching unit performs the matching processing using the digital voice data or the feature value stored in the voice storing unit. Thus, in the case where the vocabulary dictionary managing unit increases the number of recognition target words according to the state of the processing accepted from the user, for example, the matching unit performs the matching processing with the recognition target words increased in number using the digital voice data or the feature value stored in the voice storing unit. Therefore, the user does not have to utter the same word again, thus alleviating the burden on the user.

In the above-described voice recognition apparatus according to the present invention, it is preferable that, when the matching unit calculates the degree of matching with the recognition target words extracted by the vocabulary dictionary managing unit using the digital voice data or the feature value stored in the voice storing unit, the vocabulary dictionary managing unit excludes the words extracted as the recognition target words immediately before that and extracts the recognition target words from the plurality of words stored in the vocabulary dictionary storing unit. With this configuration, for example, when a recognition result cannot be obtained and then the matching processing of the same word is performed again, the matching unit performs the matching processing using recognition target words excluding the words extracted immediately before that as the recognition target words. Therefore, the recognition speed of the voice recognition apparatus improves. As a result, it is possible to achieve the voice recognition apparatus in which the recognition performance improves without the need for a user to carry out a troublesome operation.

The above-described voice recognition apparatus may be realized by hardware. However, a computer may execute a program stored in a recording medium, thereby realizing this voice recognition apparatus. More specifically, a voice recognition program stored in a recording medium according to the present invention is a voice recognition program causing a computer to execute a voice input operation of converting an accepted voice into digital voice data, a voice analyzing operation of converting the digital voice data into a feature value, a vocabulary dictionary managing operation of extracting recognition target words, which are targeted for recognition, from a vocabulary dictionary storing unit storing a plurality of words in advance, a matching operation of calculating a degree of matching with the recognition target words extracted in the vocabulary dictionary managing operation using the feature value converted in the voice analyzing operation, and a result output operation of outputting, as a recognition result, a word having a best score from a result of calculating the degree of matching in the matching operation. The vocabulary dictionary managing operation causes a computer to execute an operation of referring to scale information serving as a scale for extracting the recognition target words stored in advance in a scale information storing unit and referring to extraction criterion information indicating a criterion of the scale information at the time of extracting the recognition target words stored in advance in an extraction criterion information storing unit, and causes a computer to execute a monitor control operation of monitoring predetermined states, and an extraction criterion information managing operation of changing the extraction criterion information stored in the extraction criterion information storing unit according to a result of the monitoring in the monitor control operation. With the change in the extraction criterion information, the vocabulary dictionary managing operation causes a computer to execute an operation of increasing or decreasing the number of the recognition target words to be extracted from the plurality of words stored in the vocabulary dictionary storing unit.

DETAILED DESCRIPTION OF THE INVENTION

Figure 1:
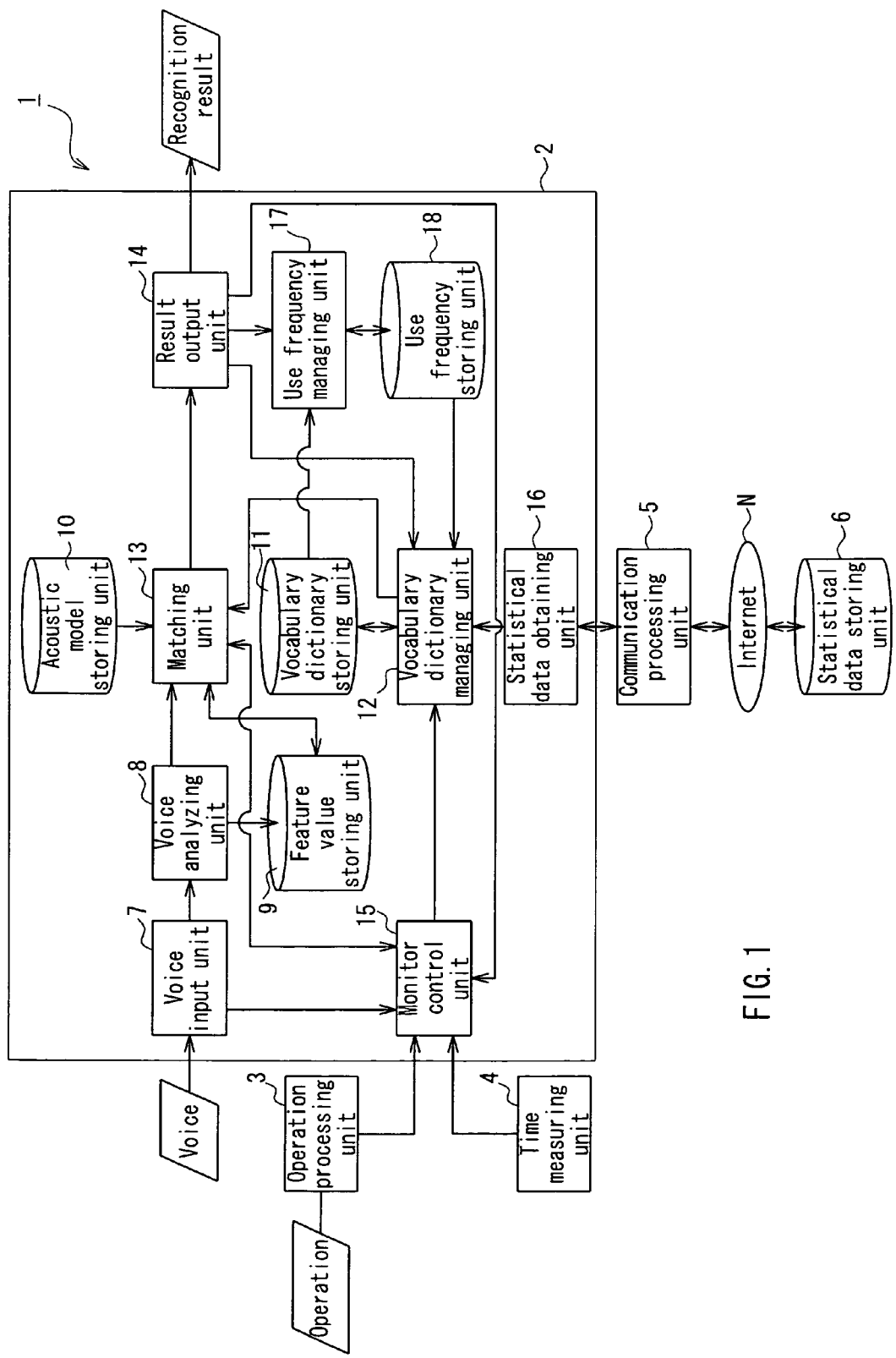
FIG. 1 is a block diagram showing a configuration of a voice recognition apparatus according to Embodiment 1 of the present invention.

Hereinafter, specific embodiments of the present invention will be described in detail with reference to the drawings.
Embodiment 1

The following is a description of an embodiment of the present invention based on FIGS. 1 to 11.

An information delivery system 1 according to the present embodiment performs a voice recognition processing of recognizing a user's speech, and includes a voice recognition apparatus 2 that has a function of receiving a user's voice from an upper program such as a voice interaction application, for example, and returning the recognition result to the upper program, for example, an operation processing unit 3 that accepts a user's operation, a time measuring unit 4 that measures a predetermined time, a communication processing unit 5 that is connected to the internet N and a statistical data storing unit 6 that stores statistical data.

In the following, the entire configuration of the information delivery system 1 will be described briefly before discussing the detailed configuration of the voice recognition apparatus 2.

The operation processing unit 3 accepts a user's operation inputted through a pointing device, a keyboard, a touch panel or the like and converts the accepted operation into operation data. Then, the operation processing unit 3 executes descriptions of the converted operation data. The operation data are, for example, data indicating turning on/off of the power of the system, data indicating starting of the operation, data indicating halt of the operation, data indicating termination of the operation, data indicating cancellation (resetting) of the operation or data indicating confirmation of the operation.

The time measuring unit (measurement unit) 4 analyzes a position determining signal sent from a GPS receiver, which is not shown in the figure, for example, and detects the current date and time based on date and time data contained in this position determining signal. The time measuring unit 4 may be configured simply by a counter or a timer, without any particular limitation.

The communication processing unit 5 functions as a Web client on the internet N. At the request of the voice recognition apparatus 2, the communication processing unit 5 receives statistical data in HTML (Hyper Text Markup Language) format from the statistical data storing unit 6, which will be described later, according to HTTP (Hyper Text Transfer Protocol), for example. The received statistical data are outputted to the voice recognition apparatus 2. It should be noted that the communication processing unit 5 may include a browser for browsing the received statistical data.

The statistical data storing unit 6 stores statistical data on a plurality of words. The statistical data storing unit 6 functions as a Web server on the internet N. The statistical data are, for example, data statistically indicating frequencies of use of the plurality of words according to a gender, an age, a region, etc. Upon request from the communication processing unit 5, the statistical data storing unit 6 determines statistical data requested by the communication processing unit 5 based on, for example, URI (Universal Resource Identifier) or the like and transmits these statistical data to the communication processing unit 5 in the HTML format, for example.

(Configuration of Voice Recognition Apparatus)

Here, the voice recognition apparatus 2 according to the present embodiment includes a voice input unit 7, a voice analyzing unit 8, a feature value storing unit 9, an acoustic model storing unit 10, a vocabulary dictionary storing unit 11, a vocabulary dictionary managing unit 12, a matching unit 13, a result output unit 14, a monitor control unit 15, a statistical data obtaining unit 16, a use frequency managing unit 17 and a use frequency storing unit 18.

The voice input unit 7 accepts a user's speech (voice) inputted through a microphone or the like and converts the accepted voice into digital voice data. In other words, when the voice input unit 7 accepts the user's speech, it detects voice sections in the inputted voice using a predetermined voice section criterion. Then, the voice input unit 7 converts the voice in the detected voice sections into the digital voice data. The digital voice data are outputted to the voice analyzing unit 8, which will be described below.

The voice analyzing unit 8 analyzes the digital voice data and calculates a feature value. As the feature value, MFCC, LPC cepstrum, a power, a primary or secondary regression coefficient thereof as well as multidimensional vectors such as results of dimensional compression of these values by a principal component analysis and a discriminant analysis are used in many cases, though there is no particular limitation in the present embodiment. The feature value is outputted to the feature value storing unit 9 and the matching unit 13, which will be described below.

The feature value storing unit (voice storing unit) 9 stores the feature value as historical information. In other words, the feature value storing unit 9 stores the feature value outputted from the voice analyzing unit 8 together with intrinsic information. The intrinsic information indicates a starting point, an ending point, an identification number, etc. of the feature value. Incidentally, the feature value storing unit 9 may store the digital voice data outputted from the voice input unit 7 instead of the feature value.

The acoustic model storing unit 10 stores data obtained by statistically modeling information about which phoneme tends to become what kind of feature value. Examples of the acoustic model can include HMM (Hidden Markov Model) and the like.

The vocabulary dictionary storing unit (a scale information storing unit, an extraction criterion information storing unit) 11 stores a plurality of words and information about the plurality of words in advance. Examples of the information about the words include an ID intrinsic to each of the words (each word in the vocabulary), a word notation, etc. and also could include any other information such as a conjunctive rule between the words (grammatical information). Also, for each of the plurality of words, the vocabulary dictionary storing unit 11 stores in advance scale information serving as a scale when the vocabulary dictionary managing unit 12, which will be described later, extracts recognition target words, which are targeted for recognition. Furthermore, the vocabulary dictionary storing unit 11 stores in advance extraction criterion information indicating a criterion of the scale information when the vocabulary dictionary managing unit 12 extracts the recognition target words.

The vocabulary dictionary managing unit 12 extracts the recognition target words, which are targeted for recognition, from the plurality of words stored in the vocabulary dictionary storing unit 11. More specifically, a recognition target word extracting unit 12a (see FIG. 2) of the vocabulary dictionary managing unit 12 extracts the recognition target words. Also, the vocabulary dictionary managing unit 12 changes the extraction criterion information stored in the vocabulary dictionary storing unit 11 based on updating signals (a first updating signal, a second updating signal) inputted from the monitor control unit 15, which will be described later. Incidentally, although the description above has been directed to an example in which the vocabulary dictionary managing unit 12 includes the recognition target word extracting unit 12a, there is no particular limitation to this. For example, the matching unit 13, which will be described later, may include the recognition target word extracting unit. In other words, the matching unit 13 may extract the recognition target words.

Moreover, the vocabulary dictionary managing unit 12 updates the scale information stored in the vocabulary dictionary storing unit 11 using statistical data inputted from the statistical data obtaining unit 16, which will be described later, and use frequency data stored in the use frequency storing unit 18, which will be described later. It should be noted that specific examples of the vocabulary dictionary storing unit 11 and the vocabulary dictionary managing unit 12 will be described later.

When the matching unit 13 receives the feature value from the voice analyzing unit 8, it performs a matching processing based on this feature value. In other words, the matching unit 13 compares this feature value and the acoustic model storing unit 10, thereby extracting a phoneme string for each frame (a fixed time period) contained in a voice section. Based on the extracted phoneme string, the matching unit 13 calculates a degree of matching (a degree of similarity) according to the recognition target words extracted from the vocabulary dictionary managing unit 12. This processing of calculating the degree of matching is configured so as to be executed by using a conventionally-known program for matching processing. The calculated degree of matching is outputted to the result output unit 14, which will be described later. It is preferable that the matching unit 13 reads out the feature value stored in the feature value storing unit 9 when it receives a readout signal from the monitor control unit 15, which will be described later, because the recognition result is not obtained, for example. According to this configuration, in the case where the vocabulary dictionary managing unit 12 increases the number of the recognition target words because the recognition result is not obtained, for example, the matching unit 13 uses the feature value stored in the feature value storing unit 9 so as to perform the matching processing with the recognition target words increased in number. Therefore, the user does not have to utter the same word again, thus alleviating the burden on the user.

The result output unit 14 extracts words whose degree of matching exceeds a reference value among the degrees of matching calculated in the matching unit 13 and outputs a word having the best score among the extracted words as a recognition result. The recognition result is passed on to the upper program but may also be outputted to an output device such as a display, a speaker or a printer. Alternatively, the recognition result may be outputted to a CPU, which is not shown in the figure, as a command.

The monitor control unit 15 monitors at least one monitor target from a processing state of the operation accepted from the user, a processing state of the voice accepted from the user and a predetermined time passed from the time measuring unit 4. Thus, the monitor control unit 15 monitors the operation processing unit 3, the time measuring unit 4, the voice input unit 7, the matching unit 13 and the result output unit 14 described above. The monitor control unit 15 outputs a first updating signal or a second updating signal to the vocabulary dictionary managing unit 12 according to the result of monitoring. Also, the monitor control unit 15 outputs a readout signal to the matching unit 13 according to the result of monitoring. Incidentally, a specific example of the monitor control unit 15 will be described later.

The statistical data obtaining unit 16 requests the communication processing unit 5 to obtain the statistical data at an arbitrary timing. As described earlier, the statistical data are, for example, data statistically indicating frequencies of use of the plurality of words according to a gender, an age, a region, etc. The statistical data obtaining unit 16 outputs the statistical data inputted from the communication processing unit 5 to the vocabulary dictionary managing unit 12. Incidentally, although the statistical data obtaining unit 16 obtains the statistical data via the internet N, there is no particular limitation to this. For example, it may also be possible to obtain the statistical data by reading statistical data stored in a recording medium such as a CD-ROM.

The use frequency managing unit 17 calculates the frequency of use of each of the plurality of words stored in the vocabulary dictionary storing unit 11. In the present embodiment, the use frequency managing unit 17 calculates the use frequency of each of the plurality of words based on a result of monitoring the number of uses for each of the plurality of words stored in the vocabulary dictionary storing unit 11 and past use frequency data stored in the use frequency storing unit 18, which will be described below. However, there is no particular limitation to this. For example, it may also be possible to calculate the use frequency utilizing the degree of matching outputted from the matching unit 13.

The use frequency storing unit 18 stores the use frequency calculated by the use frequency managing unit 17 as use frequency data. The use frequency data correspond to each of the plurality of words stored in the vocabulary dictionary storing unit 11.

Now, the voice recognition apparatus 2 described above is realized by installing a program in an arbitrary computer such as a personal computer. In other words, the voice input unit 7, the voice analyzing unit 8, the vocabulary dictionary managing unit 12, the matching unit 13, the result output unit 14, the monitor control unit 15, the statistical data obtaining unit 16 and the use frequency managing unit 17 described above are embodied by an operation of a CPU of a computer according to a program realizing the functions of these units. Thus, a program for realizing the functions of the voice input unit 7, the voice analyzing unit 8, the vocabulary dictionary managing unit 12, the matching unit 13, the result output unit 14, the monitor control unit 15, the statistical data obtaining unit 16 and the use frequency managing unit 17 or a recording medium recording this program is also an embodiment of the present invention. Further, the feature value storing unit 9, the acoustic model storing unit 10, the vocabulary dictionary storing unit 11 and the use frequency storing unit 18 are embodied by a built-in storage device in a computer or a storage device accessible from this computer. It should be noted that, since the present embodiment has a configuration that can be connected to the internet N, the above-mentioned program may also be downloaded from the internet N.

(Specific Example of Vocabulary Dictionary Storing Unit)

Figure 2:
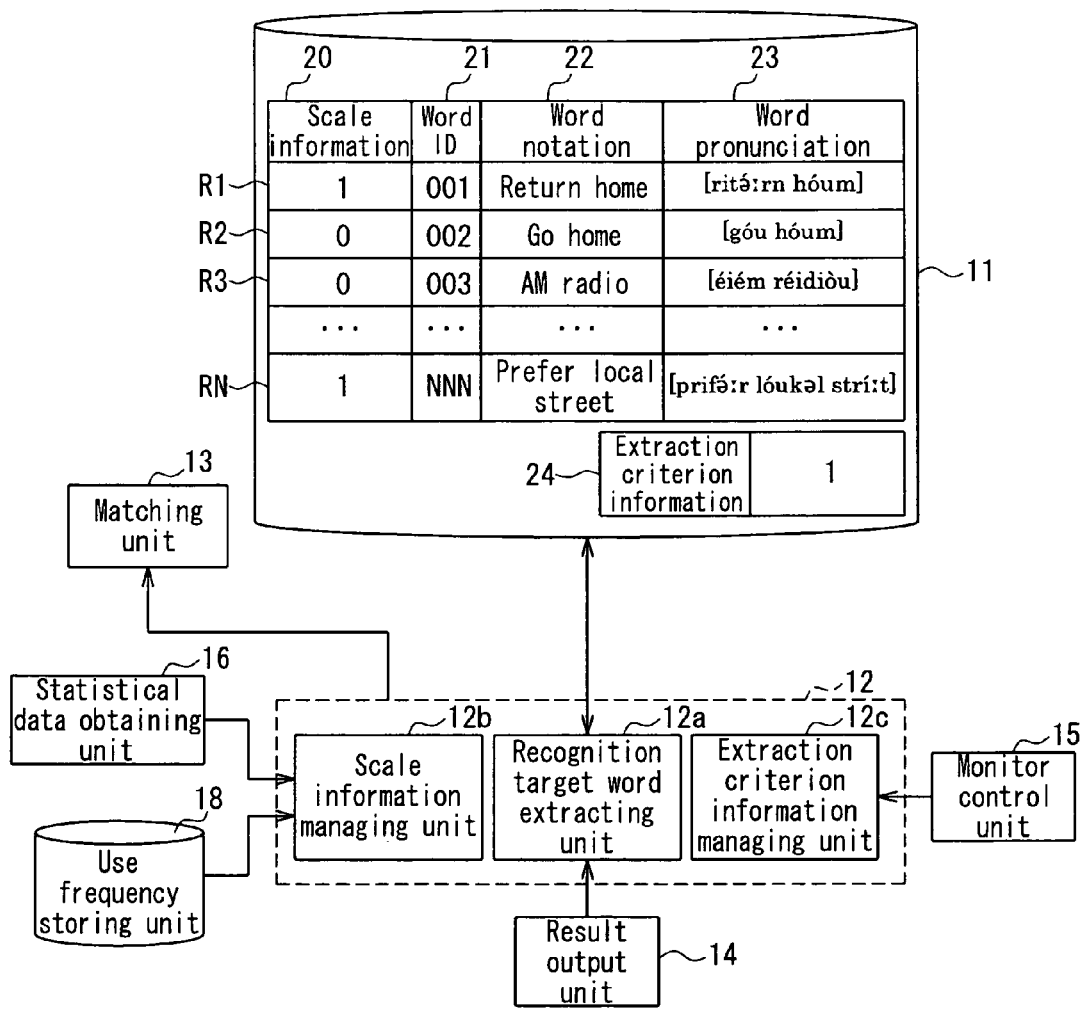
FIG. 2 is a block diagram showing a main portion including a vocabulary dictionary storing unit and a vocabulary dictionary managing unit in the above-noted voice recognition apparatus.

The following is a description of specific examples of the vocabulary dictionary storing unit 11 and the vocabulary dictionary managing unit 12 included in the voice recognition apparatus 2 with reference to FIG. 2. It should be noted that an example of the vocabulary stored in the vocabulary dictionary storing unit 11 shown in FIG. 2 is directed to the case where the voice recognition apparatus 2 is used for a car navigation system.

As shown in FIG. 2, the vocabulary dictionary storing unit 11 stores scale information 20, a word ID 21, a word notation 22 and a word pronunciation 23. The scale information 20 is information serving as a scale when the vocabulary dictionary managing unit 12 extracts the recognition target words. The word ID 21 is information intrinsic to each word in the vocabulary. The word notation 22 is information about how a word is written. The word pronunciation 23 is information about how a word represented by the word notation 22 is pronounced. A phoneme sequence (not shown) corresponding to this word pronunciation 23 serves as a word used for the matching processing by the matching unit 13. In other words, the recognition target word extracting unit 12a in the vocabulary dictionary managing unit 12 extracts the recognition target words, which are targeted for recognition, from the phoneme sequence corresponding to this word pronunciation 23. Incidentally, although the word pronunciation 23 is stored using one kind of phonetic signs in FIG. 2, there is no particular limitation to this. In other words, the word pronunciation 23 may be stored using the other kinds of phonetic signs or stored as the above-noted phoneme sequence itself. Also, the vocabulary dictionary storing unit 11 further stores extraction criterion information 24 serving as a criterion of the scale information 20 when the recognition target word extracting unit 12a extracts the recognition target words. Incidentally, although the vocabulary dictionary storing unit 11 stores the scale information 20, the word ID 21, the word notation 22 and the word pronunciation 23 in a table structure, there is no particular limitation to this. The table structure may be replaced by a tree structure, a network structure, a file structure or the like.

Here, in the example illustrated in FIG. 2, as the scale information 20, "1" is stored in a first row R1, "0" is stored in a second row R2, "0" is stored in a third row R3, . . . "1" is stored in an N-th row RN. As the word ID 21, "001" is stored in the first row R1, "002" is stored in the second row R2, "003" is stored in the third row R3, . . . "NNN" is stored in the N-th row RN. As the word notation 22, "Return home" is stored in the first row R1, "Go home" is stored in the second row R2, "AM radio" is stored in the third row R3, . . . "Prefer local street" is stored in the N-th row RN. As the word pronunciation 23, "[ritə́ːrn hóum]" is stored in the first row R1, "[góu hóum]" is stored in the second row R2, "[éiém réidiòu]" is stored in the third row R3, . . . "[prifə́ːr lóukəl stríːt]" is stored in the N-th row RN. Further, as the extraction criterion information 24, "1" is stored.

In the present embodiment, when the extraction criterion information 24 is "1", the recognition target word extracting unit 12a extracts recognition target words based on the scale information 20. More specifically, the recognition target word extracting unit 12a extracts words whose scale information 20 corresponds to "1" as the recognition target words. On the other hand, when the extraction criterion information 24 is "0", the recognition target word extracting unit 12a extracts all the words stored in the vocabulary dictionary storing unit 11 as the recognition target words regardless of the scale information 20.

Thus, in the example illustrated in FIG. 2, since "1" is stored as the extraction criterion information 24, the recognition target word extracting unit 12a extracts the recognition target words based on the scale information 20. In other words, the recognition target word extracting unit 12a extracts the words in the first row R1 and the N-th row RN whose scale information 20 is "1" as the recognition target words.

Figure 3:
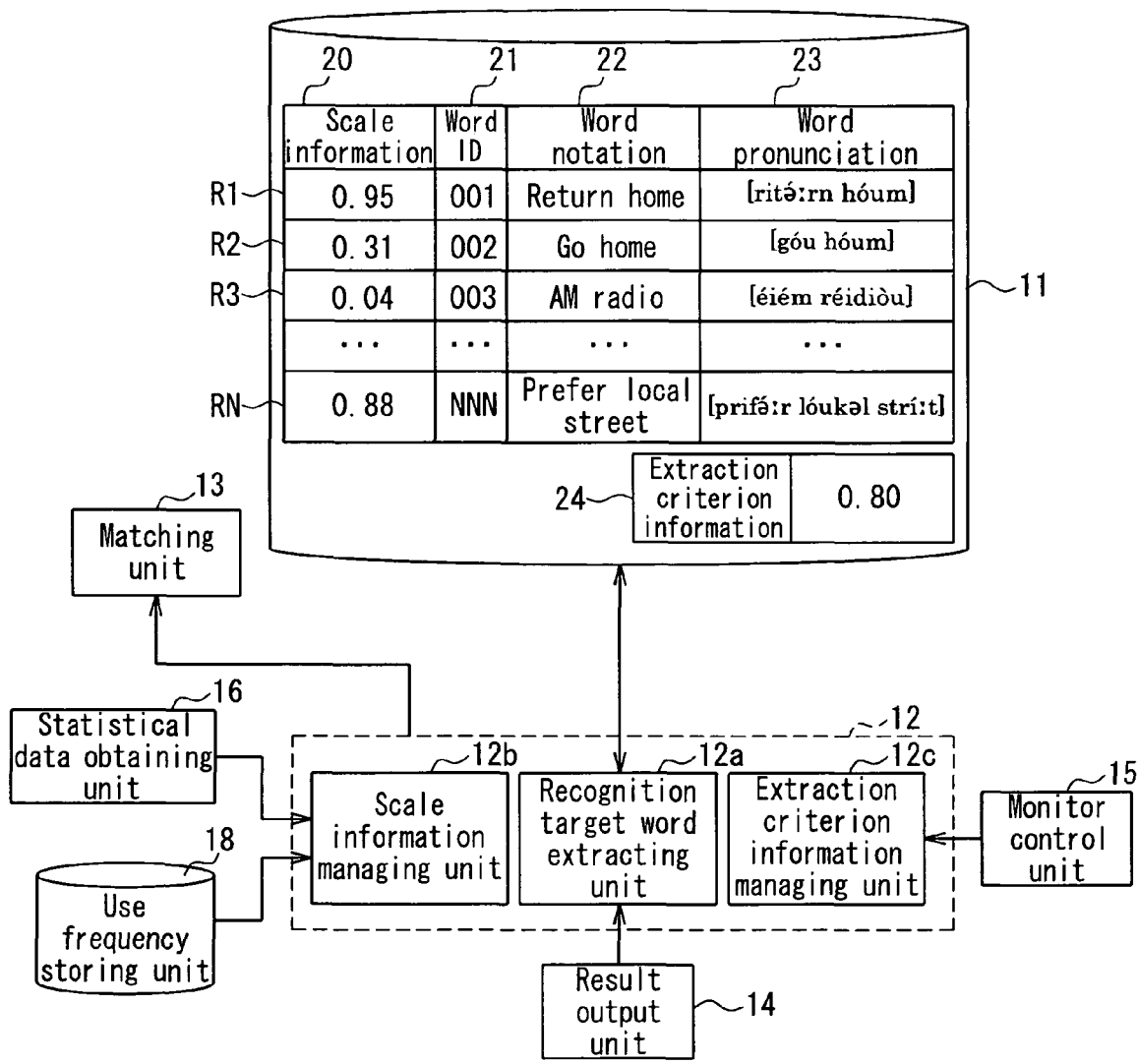
FIG. 3 is a block diagram showing a main portion including a vocabulary dictionary storing unit and a vocabulary dictionary managing unit in the above-noted voice recognition apparatus.

Although the above description has been directed to the example in which the scale information 20 and the extraction criterion information 24 are expressed by binary data of "1" and "0", it also may be possible to express the scale information 20 and the extraction criterion information 24 by continuous data from "0" to "1", for example, as shown in FIG. 3.

In other words, in the example illustrated in FIG. 3, as the scale information 20, "0.95" is stored in the first row R1, "0.31" is stored in the second row R2, "0.04" is stored in the third row R3, . . . "0.88" is stored in the N-th row RN. Further, as the extraction criterion information 24, "0.80" is stored. Incidentally, although the scale information 20 and the extraction criterion information 24 are expressed to the second decimal place in FIG. 3, there is no limitation to this. The scale information 20 and the extraction criterion information 24 can be expressed in any number of digits.

In the present embodiment, when the extraction criterion information 24 is other than "0", the recognition target word extracting unit 12a extracts the recognition target words based on the scale information 20. More specifically, the recognition target word extracting unit 12a uses the extraction criterion information 24 as a threshold and extracts words whose scale information 20 exceeds the extraction criterion information 24 as the recognition target words. On the other hand, when the extraction criterion information 24 is "0", the recognition target word extracting unit 12a extracts all the words stored in the vocabulary dictionary storing unit 11 as the recognition target words regardless of the scale information 20.

Thus, in the example illustrated in FIG. 3, since "0.80" is stored as the extraction criterion information 24, the recognition target word extracting unit 12a extracts recognition target words based on the scale information 20. In other words, the recognition target word extracting unit 12a extracts words whose scale information 20 is larger than the extraction criterion information 24 "0.80" as the recognition target words. Here, since the scale information 20 "0.95" in the first row R1 and the scale information 20 "0.88" in the N-th row RN apply, the words in the first row R1 and the N-th row RN are extracted as the recognition target words.

Figure 4:
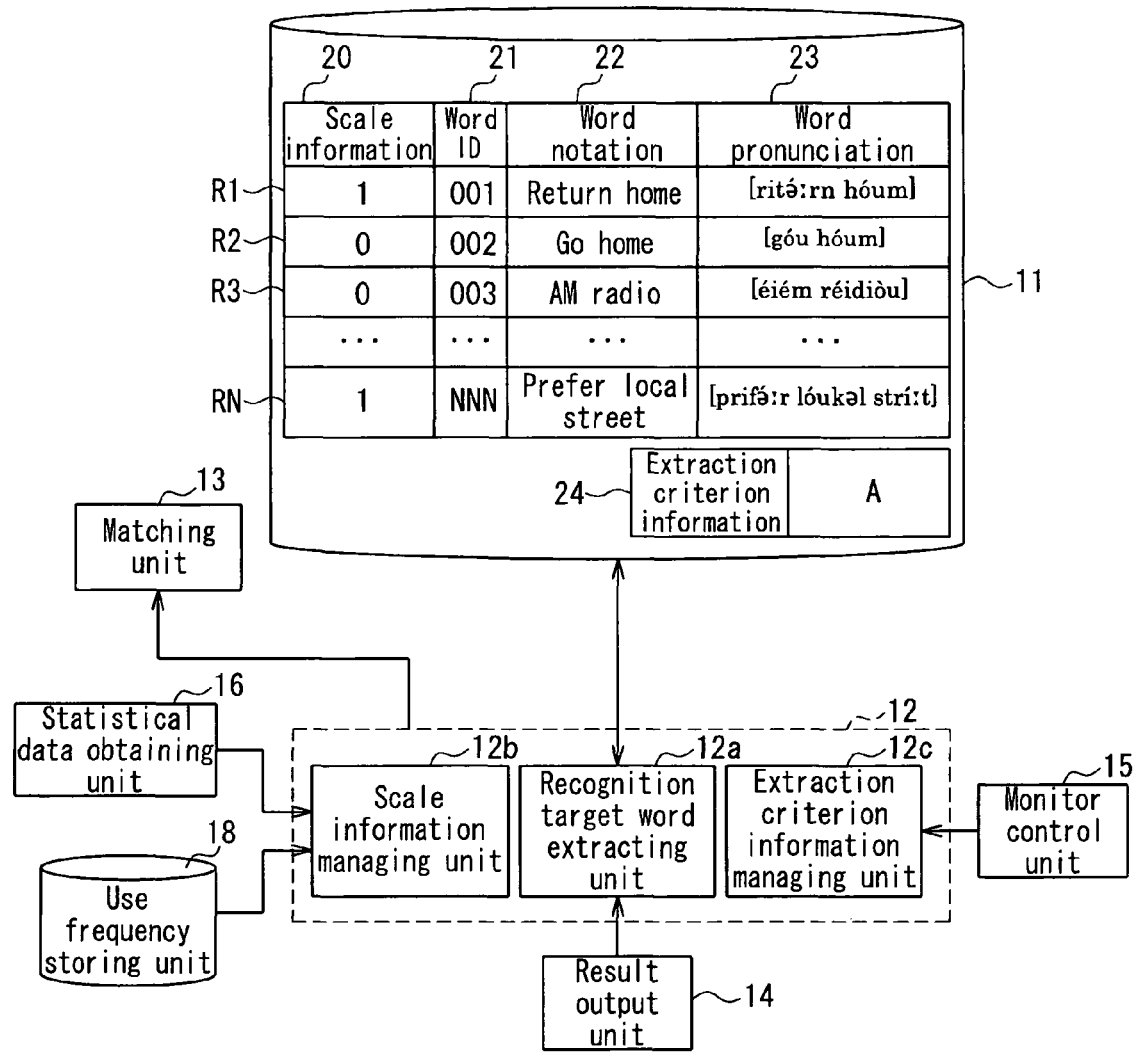
FIG. 4 is a block diagram showing a main portion including a vocabulary dictionary storing unit and a vocabulary dictionary managing unit in the above-noted voice recognition apparatus.

Also, as shown in FIG. 4, the scale information 20 and the extraction criterion information 24 may be expressed by ranks. FIG. 4 illustrates an example of categorizing the scale information 20 into three ranks, namely, rank A, rank B and rank C. For example, rank A, rank B and rank C are set in the order of decreasing frequency of use of the word, though there is no particular limitation to this. As the extraction criterion information 24, not only rank A, rank B and rank C but also rank D targeting all the words regardless of the scale information 20 can be stored. Incidentally, as the extraction criterion information 24, rank E for rank A and rank B, rank F for rank A and rank C and rank G for rank B and rank C may be contained.

Here, in the example illustrated in FIG. 4, rank A is stored in the first row R1, rank B is stored in the second row R2, rank C is stored in the third row R3, . . . rank A is stored in the N-th row RN as the scale information 20. Further, rank A is stored as the extraction criterion information 24.

In the present embodiment, when the extraction criterion information 24 is other than rank D, the recognition target word extracting unit 12a extracts recognition target words based on the scale information 20. More specifically, the recognition target word extracting unit 12a extracts words whose scale information 20 is in the same rank as the extraction criterion information 24 as the recognition target words. On the other hand, when the extraction criterion information 24 is rank D, the recognition target word extracting unit 12a extracts all the words stored in the vocabulary dictionary storing unit 11 as the recognition target words regardless of the scale information 20.

Thus, in the example illustrated in FIG. 4, since rank A is stored as the extraction criterion information 24, the recognition target word extracting unit 12a extracts the recognition target words based on the scale information 20. In other words, the recognition target word extracting unit 12a extracts the words whose scale information 20 is in the same rank as the extraction criterion information 24, which is rank A, as the recognition target words. Here, since rank A of the scale information 20 in the first row R1 and rank A of the scale information 20 in the N-th row RN apply, the words in the first row R1 and the N-th row RN are extracted as the recognition target words.

(Specific Example of Vocabulary Dictionary Managing Unit)

The vocabulary dictionary managing unit 12 includes the recognition target word extracting unit 12a, a scale information managing unit 12b and an extraction criterion information managing unit 12c.

With the change in the extraction criterion information 24 indicating the criterion of the scale information 20 at the time of extracting recognition target words, the recognition target word extracting unit 12a increases or decreases the number of recognition target words to be extracted from a plurality of words stored in the vocabulary dictionary storing unit 11, as described above. Incidentally, when the matching unit 13 performs the matching processing with the recognition target words using the feature values stored in the feature value storing unit 9, it is preferable that the recognition target word extracting unit 12a excludes the words extracted immediately before that as the recognition target words and extracts recognition target words. In this way, when a recognition result cannot be obtained and then the matching processing of the same word is performed again, for example, the matching unit 13 can perform the matching processing using recognition target words excluding the words extracted immediately before that as the recognition target words. Therefore, a recognition speed of the voice recognition apparatus 2 improves.

The scale information managing unit 12b updates the scale information 20 using the use frequency data stored in the use frequency storing unit 18 and the statistical data inputted from the statistical data obtaining unit 16. In the case where the scale information 20 is expressed by binary data of "1" and "0", the scale information managing unit 12b updates the scale information 20 corresponding to words used with a high frequency to "1" and updates the scale information 20 corresponding to words used with a low frequency to "0". For example, if a value calculated from the use frequency data and the statistical data is equal to or larger than a reference value, it is determined to be the word used with a high frequency, thus updating the scale information 20 to "1". If the value calculated from the use frequency data and the statistical data is smaller than the reference value, it is determined to be the word used with a low frequency, thus updating the scale information 20 to "0". Alternatively, in the case where the scale information 20 is expressed by continuous data from "0" to "1", the scale information managing unit 12b updates the scale information 20 corresponding to words used with a high frequency so as to become larger (become closer to "1") and updates the scale information 20 corresponding to words used with a low frequency so as to become smaller (become closer to "0"). Furthermore, in the case where the scale information 20 is expressed by ranks, the scale information managing unit 12b updates the scale information 20 corresponding to words used with a high frequency so as to have a higher rank and updates the scale information 20 corresponding to words used with a low frequency so as to have a lower rank. Incidentally, although the scale information managing unit 12b updates the scale information 20 at the timing when the use frequency data are updated or the timing when the statistical data are inputted, there is no particular limitation to this. The scale information 20 can be updated at any timing.

The extraction criterion information managing unit 12c changes the extraction criterion information 24 stored in the vocabulary dictionary storing unit 11 based on the updating signal (the first updating signal, the second updating signal) inputted from the monitor control unit 15. In the case where the extraction criterion information 24 is expressed by binary data of "1" and "0", the extraction criterion information managing unit 12c changes the extraction criterion information 24 to "1" when the first updating signal is inputted. The extraction criterion information managing unit 12c changes the extraction criterion information 24 to "0" when the second updating signal is inputted. Alternatively, in the case where the extraction criterion information 24 is expressed by continuous data from "0" to "1", the extraction criterion information managing unit 12c changes the extraction criterion information 24 so as to become smaller (become closer to "0") when the first updating signal is inputted. The extraction criterion information managing unit 12c changes the extraction criterion information 24 so as to become larger (become closer to "1") when the second updating signal is inputted. Furthermore, in the case where the extraction criterion information 24 is expressed by ranks, the extraction criterion information managing unit 12c makes the extraction criterion information 24 have a lower rank when the first updating signal is inputted. The extraction criterion information managing unit 12c makes the extraction criterion information 24 have a higher rank when the second updating signal is inputted. It is noted that the first updating signal and the second updating signal from the monitor control unit 15 will be detailed later.

(Variation of Storage Form)

Although the above description has been directed to the example in which the scale information 20 and the extraction criterion information 24 are stored in the vocabulary dictionary storing unit 11, there is no particular limitation to this. In other words, although the above description has been directed to the example in which the vocabulary dictionary storing unit 11 corresponds to the scale information storing unit storing the scale information 20 and the extraction criterion information storing unit storing the extraction criterion information 24, the configurations illustrated in FIGS. 5 to 7, for example, are also possible.

Figure 5:
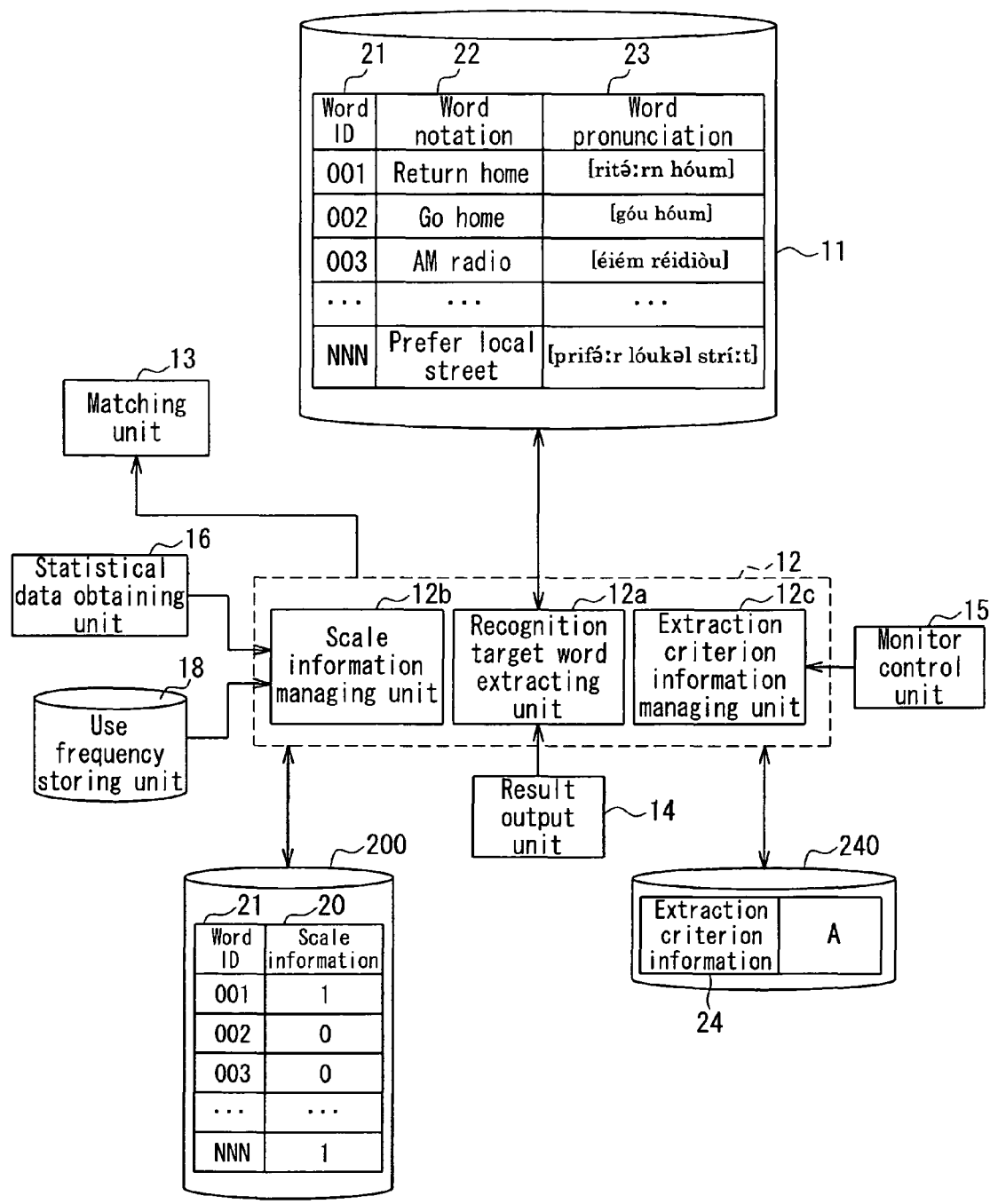
FIG. 5 is a block diagram showing a first variation of FIG. 2.

First, as shown in FIG. 5, a scale information storing unit 200 and an extraction criterion information storing unit 240 may be separated from the vocabulary dictionary storing unit 11. In other words, in an example illustrated in FIG. 5, the scale information 20 is stored in the scale information storing unit 200. The extraction criterion information 24 is stored in the extraction criterion information storing unit 240. It should be noted that the scale information storing unit 200 and the extraction criterion information storing unit 240 may be respectively configured by different pieces of hardware or by different regions in a single piece of hardware.

In the present embodiment, the recognition target word extracting unit 12*a* reads out (refers to) the extraction criterion information 24 from the extraction criterion information storing unit 240. When the extraction criterion information 24 is "1", the recognition target word extracting unit 12*a* reads out (refers to) the scale information 20 from the scale information storing unit 200. The recognition target word extracting unit 12*a* extracts recognition target words from the vocabulary dictionary storing unit 11 based on the scale information 20. When the extraction criterion information 24 is "0", the recognition target word extracting unit 12*a* extracts all the words stored in the vocabulary dictionary storing unit 11 as the recognition target words regardless of the scale information 20.

Figure 6:
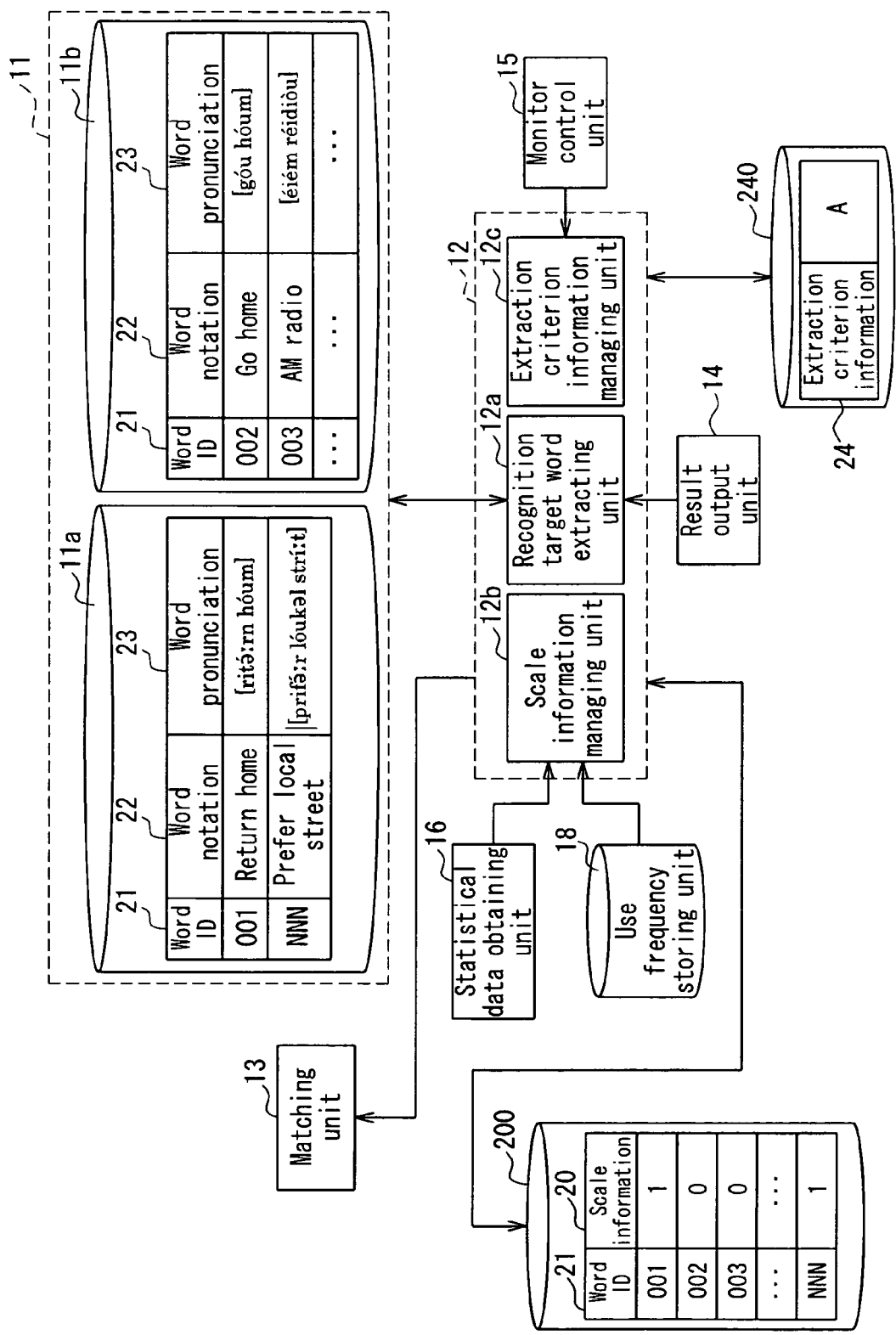
FIG. 6 is a block diagram showing a second variation of FIG. 2.

Also, as shown in FIG. 6, the vocabulary dictionary storing unit 11 may be divided into a first vocabulary dictionary storing unit 11*a* and a second vocabulary dictionary storing unit 11*b* according to the scale information 20. It should be noted that the first vocabulary dictionary storing unit 11*a* and the second vocabulary dictionary storing unit 11*b* may be respectively configured by different pieces of hardware or by different regions in a single piece of hardware.

In the present embodiment, the recognition target word extracting unit 12*a* reads out (refers to) the scale information 20. When the scale information 20 is "1", the recognition target word extracting unit 12*a* stores words whose scale information 20 corresponds to "1" in the first vocabulary dictionary storing unit 11*a*. When the scale information 20 is "0", the recognition target word extracting unit 12*a* stores words whose scale information 20 corresponds to "0" in the second vocabulary dictionary storing unit 11*b*. Then, the recognition target word extracting unit 12*a* reads out (refers to) the extraction criterion information 24. When the extraction criterion information 24 is "1", the recognition target word extracting unit 12*a* extracts words stored in the first vocabulary dictionary storing unit 11*a* as the recognition target words. When the extraction criterion information 24 is "0", the recognition target word extracting unit 12*a* extracts words stored in the first vocabulary dictionary storing unit 11*a* and the second vocabulary dictionary storing unit 11*b* as the recognition target words.

Figure 7:
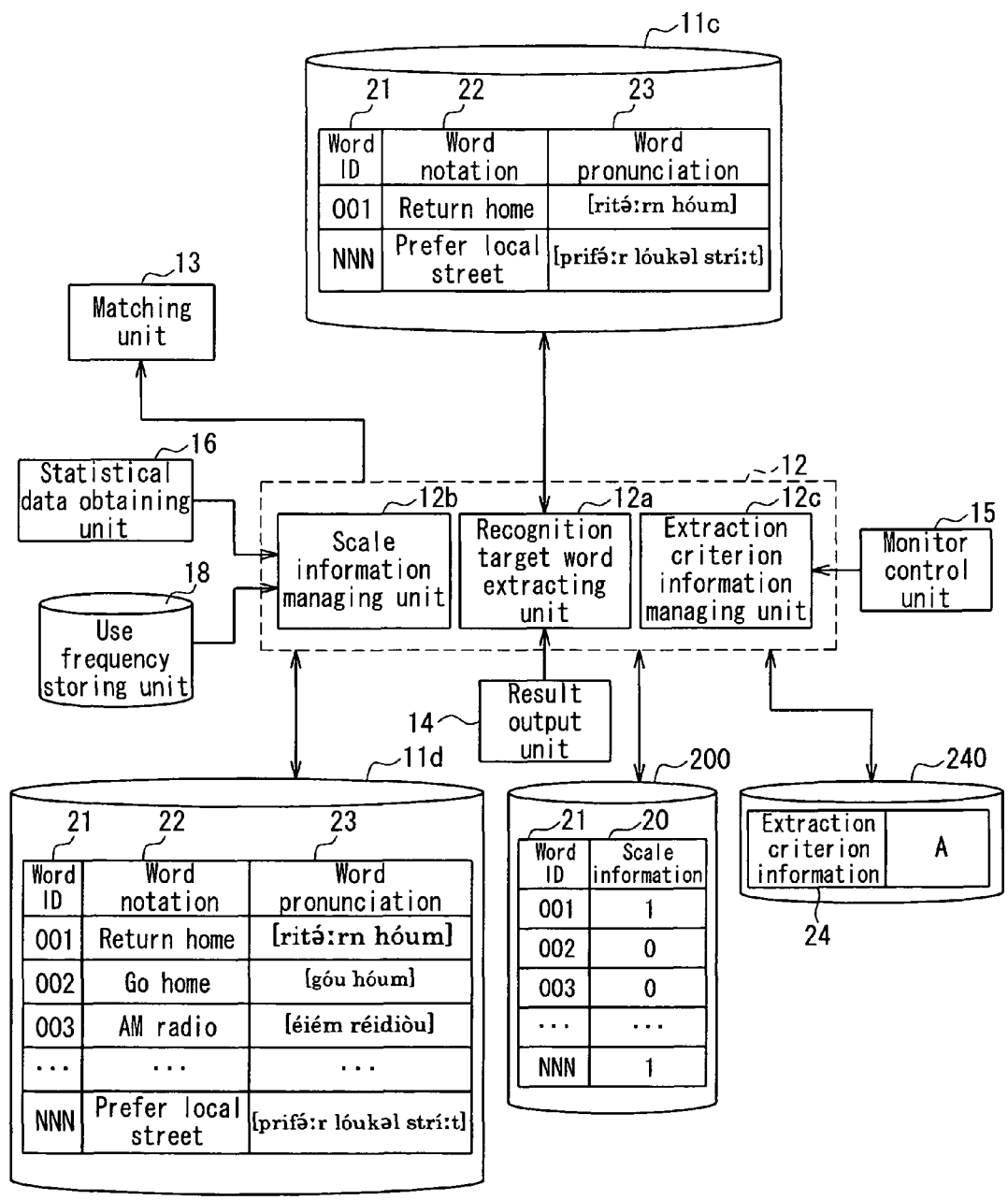
FIG. 7 is a block diagram showing a third variation of FIG. 2.

Further, as shown in FIG. 7, the vocabulary dictionary storing unit 11 may be divided into a third vocabulary dictionary storing unit 11*c* storing words targeted for recognition and a fourth vocabulary dictionary storing unit 11*d* storing all the words. The third vocabulary dictionary storing unit 11*c* and the fourth vocabulary dictionary storing unit 11*d* may be respectively configured by different pieces of hardware or by different regions in a single piece of hardware.

In the present embodiment, the recognition target word extracting unit 12*a* reads out (refers to) the scale information 20 and the extraction criterion information 24. When the extraction criterion information 24 is "1", the recognition target word extracting unit 12*a* extracts words whose scale information 20 corresponds to "1" from the fourth vocabulary dictionary storing unit 11*d* and stores the extracted words in the third vocabulary dictionary storing unit 11*c*. When the extraction criterion information 24 is "0", the recognition target word extracting unit 12*a* extracts all the words stored in the fourth vocabulary dictionary storing unit 11*d* and stores all the extracted words in the third vocabulary dictionary storing unit 11*c*. Then, the recognition target word extracting unit 12*a* extracts words stored in the third vocabulary dictionary storing unit 11*c* as the recognition target words.

(Specific Example of Monitor Control Unit)

For the monitor control unit 15, (a) to (h) below are the monitor targets. First, when the monitor control unit 15 detects at least one state from (a) to (d) below, it outputs the first updating signal to the vocabulary dictionary managing unit 12 and outputs the readout signal to the matching unit 13.

(a) in the case where a recognition result cannot be obtained (for example, in the case where a recognition result cannot be obtained because the degree of matching calculated in the matching unit 13 is "0" or in the case where a recognition result cannot be obtained because the degree of matching calculated in the matching unit 13 does not satisfy the reference value of the result output unit 14)

(b) in the case where a user conducts an operation or makes a speech so as to modify or correct an operation or a speech immediately before it (for example, in the case where a user halts the operation, terminates the operation, cancels the operation or makes a self-repair utterance of the speech)

(c) in the case where a user does not conduct a confirmation operation even after a predetermined period despite the fact that the confirmation operation of the processing is necessary (d) in the case where no operation is conducted or no speech is made for a predetermined period After outputting the first updating signal to the vocabulary dictionary managing unit 12, the monitor control unit 15 also monitors monitor targets (e) to (h) below in addition to the monitor targets (a) to (d) described above. When the monitor control unit 15 detects at least one state from (e) to (h) below, it outputs the second updating signal to the vocabulary dictionary managing unit 12. Further, when the monitor control unit 15 detects at least one state from (a) to (d) described above again, it outputs the first updating signal to the vocabulary dictionary managing unit 12 again.

(e) in the case where the matching unit 13 calculates the degree of matching predetermined times (f) in the case where a predetermined time is passed (g) in the case where a user conducts a confirmation operation within a predetermined period when the confirmation operation of the processing is necessary (h) in the case where a user does not conduct an operation or does not make a speech so as to modify or correct an operation or a speech immediately before it It should be noted that the monitor targets are not limited to (a) to (h) described above but can be set freely according to an intended use.

(Exemplary Operation of Voice Recognition Apparatus)

Figure 8:
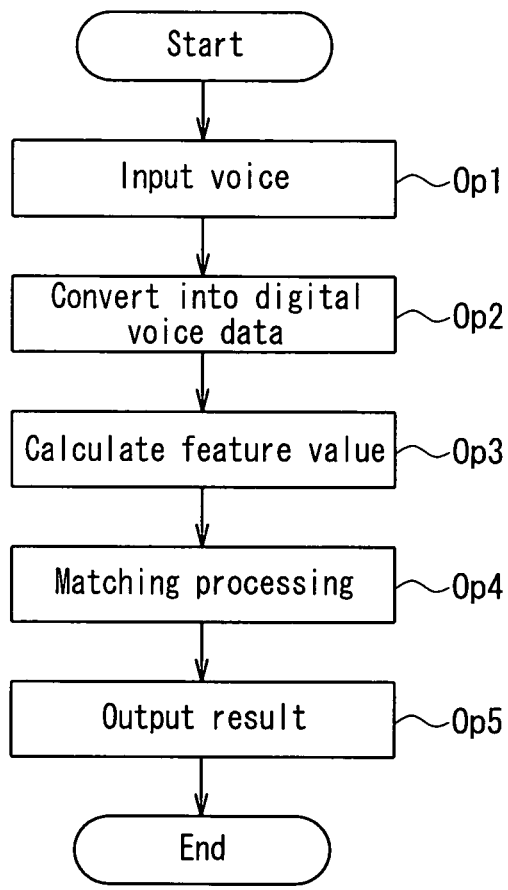
FIG. 8 is a flowchart showing an operation of the above-noted voice recognition apparatus.

In the configuration described above, a schematic operation of the voice recognition apparatus 2 will be described referring to FIG. 8, for example, in the following. As shown in FIG. 8, when a user starts inputting his/her voice (Op1), the inputted voice is outputted to the voice input unit 7. The voice input unit 7 detects a voice section in the inputted voice using a predetermined voice section criterion and converts the voice in the detected voice section into digital voice data (Op2). The resultant digital voice data are outputted to the voice analyzing unit 8. The voice analyzing unit 8 analyzes the inputted digital voice data and calculates a feature value (Op3). The calculated feature value is outputted to the feature value storing unit 9 and the matching unit 13. The matching unit 13 performs a matching processing based on the inputted feature value (Op4). Then, the result of the matching processing is outputted from the matching unit 13 to the result output unit 14, and the result output unit 14 outputs the recognition result (Op5). Incidentally, the above-described schematic operation of the voice recognition apparatus 2 is merely an example, and there is no particular limitation to this.

Figure 9:
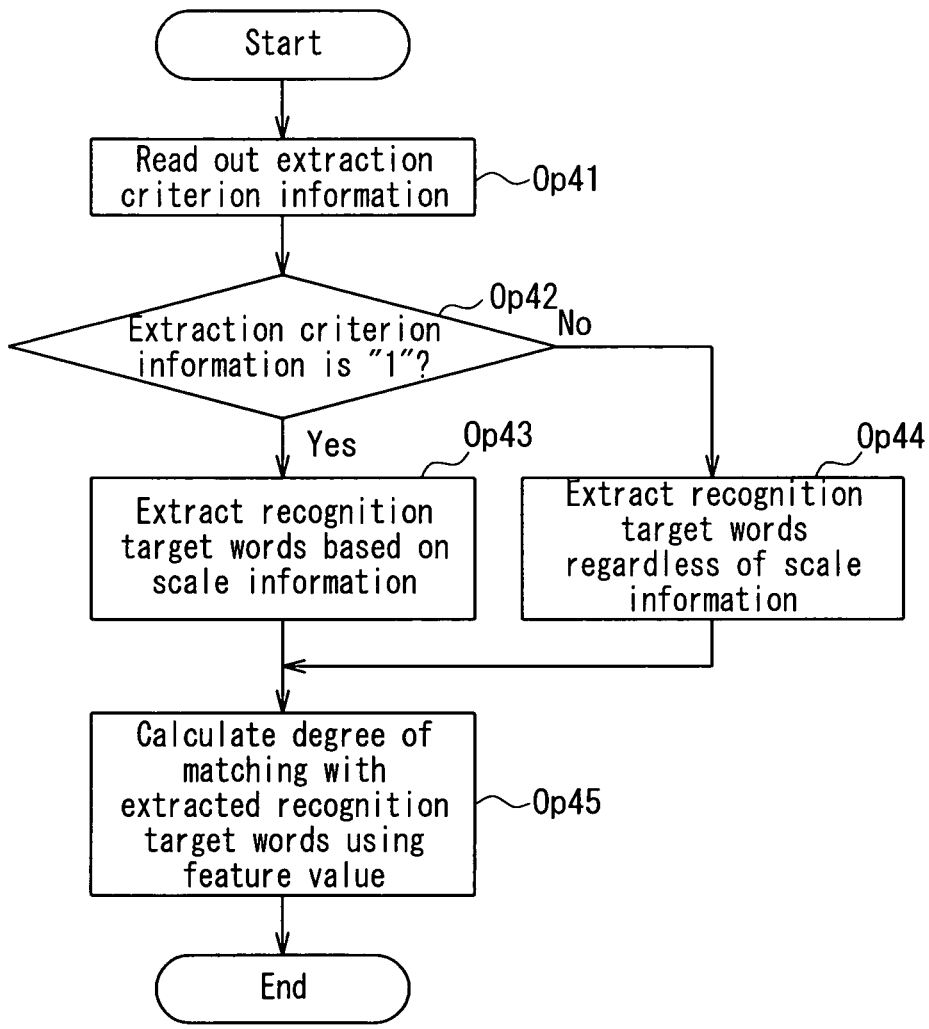
FIG. 9 is a flowchart showing an operation of a matching processing in the above-noted voice recognition apparatus.

Now, referring to FIG. 9, the operation of the matching processing (Op4) in FIG. 8 will be described in detail. As shown in FIG. 9, the recognition target word extracting unit 12a reads out (refers to) the extraction criterion information 24 stored in the vocabulary dictionary storing unit (the extraction criterion information storing unit) 11 (Op41). If the read-out extraction criterion information 24 is "1" (YES in Op42), the recognition target word extracting unit 12a reads out (refers to) the scale information 20 stored in the vocabulary dictionary storing unit (the scale information storing unit) 11 and extracts recognition target words based on the read-out scale information 20 (Op43). On the other hand, if the read-out extraction criterion information 24 is "0" (NO in Op42), the recognition target word extracting unit 12a extracts all the words stored in the vocabulary dictionary storing unit 11 as the recognition target words regardless of the scale information 20 (Op44). Then, the matching unit 13 calculates the degree of matching with the recognition target words extracted in Op43 or Op44 using the feature value calculated in Op3 in FIG. 8 (Op45).

Now, referring to FIG. 10, the operation in which the scale information managing unit 12b updates the scale information 20 will be described. Incidentally, the scale information managing unit 12b updates the scale information 20 suitably at the timing when the use frequency data are updated or the timing when the statistical data are inputted. Thus, the operation in which the scale information managing unit 12b updates the scale information 20 can be present anywhere between Op1 to Op5 in FIG. 8.

Figure 10:
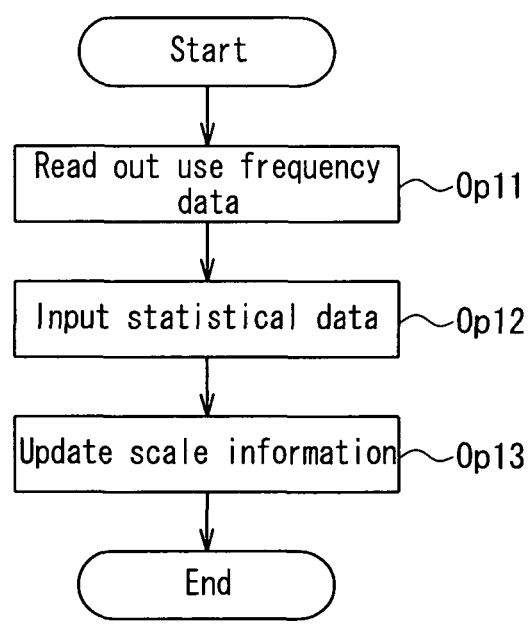
FIG. 10 is a flowchart showing an operation in which a scale information managing unit in the above-noted voice recognition apparatus updates scale information.

As shown in FIG. 10, the scale information managing unit 12b reads out the use frequency data stored in the use frequency storing unit 18 (Op11). For example, the scale information managing unit 12b reads out the use frequency data from the use frequency storing unit 18 at the timing when the use frequency data stored in the use frequency storing unit 18 are updated. The statistical data are inputted from the statistical data obtaining unit 16 to the scale information managing unit 12b (Op12). Then, the scale information managing unit 12b updates the scale information 20 using the use frequency data and the statistical data (Op13).

Now, referring to FIG. 11, the operation in which the extraction criterion information managing unit 12c changes the extraction criterion information 24 will be described. Incidentally, the extraction criterion information managing unit 12c changes the extraction criterion information 24 suitably at the timing when the first updating signal or the second updating signal is inputted from the monitor control unit 15. Thus, the operation in which the extraction criterion information managing unit 12c changes the extraction criterion information 24 can be present anywhere between Op1 to Op5 in FIG. 8.

Figure 11:
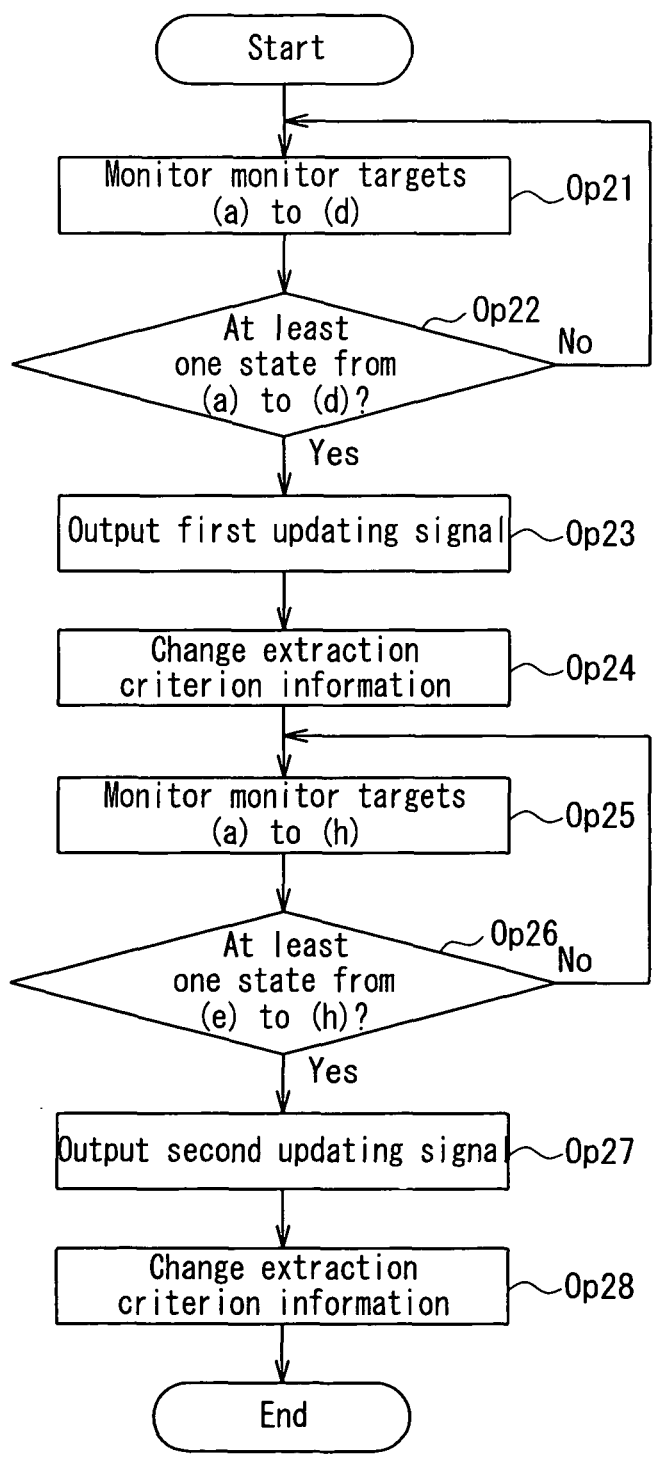
FIG. 11 is a flowchart showing an operation in which an extraction criterion information managing unit in the above-noted voice recognition apparatus updates extraction criterion information.

As shown in FIG. 11, the monitor control unit 15 monitors (a) to (d) described above as the monitor targets (Op21). If the monitor control unit 15 detects at least one state from (a) to (d) described above (YES in Op22), it outputs the first updating signal to the extraction criterion information managing unit 12c (Op23). Incidentally, the monitor control unit 15 outputs the readout signal to the matching unit 13. On the other hand, if the monitor control unit 15 does not detect at least one state from (a) to (d) described above in Op22 (NO in Op22), the operation returns to Op21, and the monitor control unit 15 monitors the monitor targets (a) to (d) described above. When the first updating signal is inputted, the extraction criterion information managing unit 12c changes the extraction criterion information (Op24).

After outputting the first updating signal to the extraction criterion information managing unit 12c, the monitor control unit 15 also monitors the monitor targets (e) to (h) described above in addition to the monitor targets (a) to (d) described above. In other words, the monitor control unit 15 monitors (a) to (h) described above as the monitor targets (Op25). If the monitor control unit 15 detects at least one state from (e) to (h) described above (YES in Op26), it outputs the second updating signal to the extraction criterion information managing unit 12c (Op27). On the other hand, if the monitor control unit 15 does not detect at least one state from (e) to (h) described above in Op26 (NO in Op26), the operation returns to Op25, and the monitor control unit 15 monitors the monitor targets (a) to (h) described above. When the second updating signal is inputted, the extraction criterion information managing unit 12c changes the extraction criterion information (Op28). Although not shown in the figure, if the monitor control unit 15 detects at least one state from (a) to (d) described above in Op26, the operation returns to Op23, and the monitor control unit 15 outputs the first updating signal to the extraction criterion information managing unit 12c again.

As described above, in the voice recognition apparatus 2 of the present embodiment, with the change in the extraction criterion information 24 indicating the criterion of the scale information 20 at the time of extracting recognition target words, the recognition target word extracting unit 12a increases or decreases the number of recognition target words to be extracted from a plurality of words stored in the vocabulary dictionary storing unit 11. Thus, the extraction criterion information 24 is changed according to the state of processing accepted from a user, for example. The recognition target word extracting unit 12a increases or decreases the number of recognition target words to be extracted from the plurality of words stored in the vocabulary dictionary storing unit 11. In the case where the recognition target word extracting unit 12a increases the number of recognition target words, the matching unit 13 performs the matching processing according to the recognition target words increased in number. Therefore, the number of the recognition target words in the voice recognition apparatus 2 increases, thereby improving the degree of freedom of a speech. In the case where the recognition target word extracting unit 12a decreases the number of recognition target words, the matching unit 13 performs the matching processing according to the recognition target words decreased in number. Therefore, the number of the recognition target words in the voice recognition apparatus 2 is restricted, thereby improving a recognition rate and a recognition speed. As a result, it is possible to achieve the voice recognition apparatus 2 in which a recognition performance improves without the need for a user to carry out a troublesome operation.

Although the present embodiment has described the example in which, at the request of the statistical data obtaining unit, the communication processing unit obtains the statistical data from the statistical data storing unit via the internet, there is no particular limitation to this. In other words, the statistical data storing unit may be formed of a storage device such as a DVD, an MO, a CD, a flexible disk or a magnetic tape, for example, and the statistical data obtaining unit may read out the statistical data directly or indirectly from this storage device. In short, the statistical data obtaining unit can be in any mode as long as it can obtain the statistical data.

Although the present embodiment has described a storage form of the scale information and the extraction criterion information by way of the examples shown in FIGS. 2 to 7, there is no particular limitation to them. In other words, any storage form may be used as long as the vocabulary dictionary managing unit can read out the scale information and the extraction criterion information and extract the recognition target words based on the scale information and the extraction criterion information that are read out.

Furthermore, although the present embodiment has described the example in which the scale information managing unit updates the scale information and the extraction criterion information managing unit updates the extraction criterion information, there is no particular limitation to this. In other words, at the time of initial setting of the voice recognition apparatus, a system administrator may set the scale information and the extraction criterion information. Also, even when the voice recognition apparatus is running, a system administrator or a user may update the scale information and change the extraction criterion information.

Embodiment 2

Embodiment 1 has described the example of extracting the recognition target words from the plurality of words stored in the vocabulary dictionary storing unit 11. Hereinafter, in contrast, Embodiment 2 will describe an example of dividing the plurality of words stored in the vocabulary dictionary storing unit 11 into a plurality of vocabulary groups and extracting recognition target words from each of the plurality of vocabulary groups, with reference to FIGS. 12 to 15. Incidentally, configurations having functions similar to those of the configurations described in Embodiment 1 will be assigned the same reference numerals as those in Embodiment 1, and the detailed description thereof will be omitted.

Figure 12:
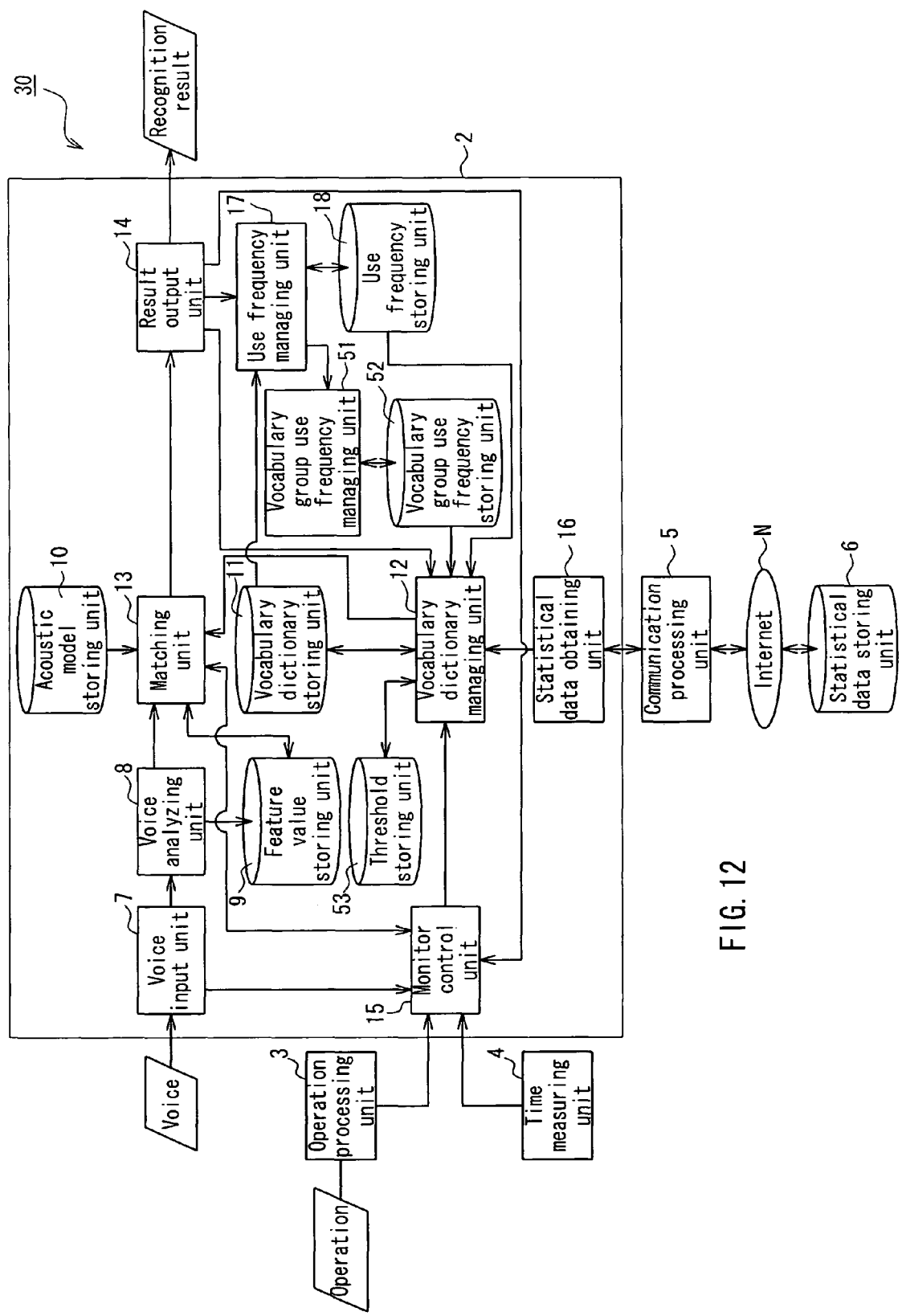
FIG. 12 is a block diagram showing a configuration of a voice recognition apparatus according to Embodiment 2.

As shown in FIG. 12, a voice recognition apparatus 50 in an information delivery system 30 according to the present embodiment further includes a vocabulary group use frequency managing unit 51, a vocabulary group use frequency storing unit 52 and a threshold storing unit 53.

The vocabulary group use frequency managing unit 51 divides the plurality of words stored in the vocabulary dictionary storing unit 11 into a plurality of vocabulary groups. For example, words sharing a common function (role) are combined to form a vocabulary group. Then, the vocabulary group use frequency managing unit 51 obtains the respective use frequencies of the plurality of words belonging to the vocabulary group from the use frequency managing unit 17 and calculates the use frequency of that vocabulary group from the obtained use frequencies. Although not shown in the figure, the vocabulary group use frequency managing unit 51 may also refer to the use frequency data stored in the use frequency storing unit 18 directly, obtain the respective use frequencies of the plurality of words belonging to the vocabulary group and calculate the use frequency of that vocabulary group from the obtained use frequencies.

The vocabulary group use frequency storing unit 52 stores the use frequency of the vocabulary group calculated by the vocabulary group use frequency managing unit 51 as vocabulary group use frequency data. The vocabulary group use frequency data are stored so as to correspond to each of the plurality of vocabulary groups.

The threshold storing unit 53 stores a threshold indicating a criterion of the vocabulary group use frequency data at the time of extracting recognition target words. The vocabulary dictionary managing unit 12 refers to the threshold. A specific example of the threshold storing unit 53 will be described later.

Now, the vocabulary group use frequency managing unit 51 is realized by installing a program in an arbitrary computer such as a personal computer. It should be noted that a program for realizing the function of the vocabulary group use frequency managing unit 51 by the computer or a recording medium recording this program is also an embodiment of the present invention. Further, the vocabulary group use frequency storing unit 52 and the threshold storing unit 53 are embodied by a built-in storage device in a computer or a storage device accessible from this computer. It should be noted that, since the present embodiment has a configuration that can be connected to the internet N, the above-mentioned program may also be downloaded from the internet N.

(Specific Examples of Vocabulary Group Use Frequency Storing Unit and Threshold Storing Unit)

Figure 13:
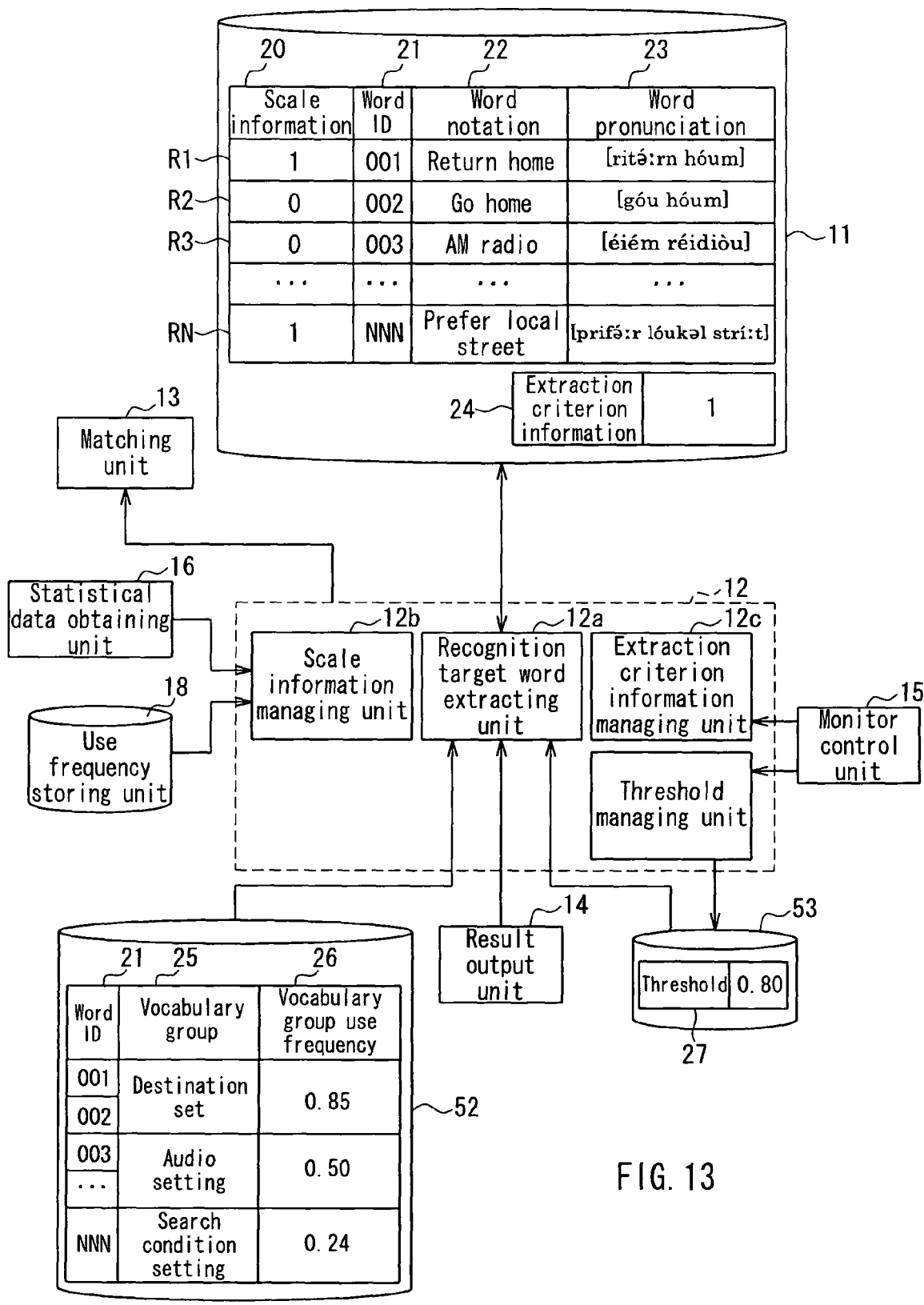
FIG. 13 is a block diagram showing a main portion including a vocabulary dictionary storing unit and a vocabulary dictionary managing unit in the above-noted voice recognition apparatus.

The following is a description of specific examples of the vocabulary group use frequency storing unit 52 and the threshold storing unit 53 included in the voice recognition apparatus 50 with reference to FIG. 13. It should be noted that an example of the vocabulary stored in the vocabulary dictionary storing unit 11 shown in FIG. 13 is directed to the case where the voice recognition apparatus 50 is used for a car navigation system.

As shown in FIG. 13, the vocabulary group use frequency storing unit 52 stores the word ID 21, a vocabulary group 25 and vocabulary group use frequency data 26. The vocabulary group 25 is obtained by dividing the plurality of words stored in the vocabulary dictionary storing unit 11 into a plurality of vocabulary groups. More specifically, the vocabulary group 25 is formed by combining the words sharing a common function (role). The vocabulary group use frequency data 26 indicate the frequency of use of the vocabulary group 25.

The threshold storing unit 53 stores a threshold 27 indicating the criterion of the vocabulary group use frequency data 26 at the time of extracting the recognition target words. More specifically, for the vocabulary group 25 whose vocabulary group use frequency data 26 are equal to or larger than the threshold 27, the recognition target word extracting unit 12a extracts all the words belonging to this vocabulary group 25 as the recognition target words regardless of the scale information 20. Also, for the vocabulary group 25 whose vocabulary group use frequency data 26 are smaller than the threshold 27, the recognition target word extracting unit 12a extracts the recognition target words from the words belonging to this vocabulary group 25 based on the scale information 20. More specifically, the recognition target word extracting unit 12a extracts the words whose scale information 20 corresponds to "1" from the words belonging to the vocabulary group 25 as the recognition target words.

In addition to the recognition target word extracting unit 12a, the scale information managing unit 12b and the extraction criterion information managing unit 12c, the vocabulary dictionary managing unit 12 includes a threshold managing unit 12d. The threshold managing unit 12d updates the threshold 27 stored in the threshold storing unit 53. More specifically, when the first updating signal is inputted from the monitor control unit 15, the threshold managing unit 12d updates the threshold 27 so as to become smaller. For example, in the case where a state of failing to obtain a recognition result continues repeatedly, the monitor control unit 15 outputs the first updating signal to the threshold managing unit 12d many times. Every time the first updating signal is inputted, the threshold managing unit 12d gradually decreases the threshold 27. Also, when the second updating signal is inputted from the monitor control unit 15, the threshold managing unit 12d updates the threshold 27 so as to become larger.

Here, in the example illustrated in FIG. 13, since the word notation 22 "Return home" corresponding to the word ID "001" and the word notation 22 "Go home" corresponding to the word ID "002" have the same function of operating a destination, they are combined into a vocabulary group 25 "Destination set". Similarly, the words sharing the common function of operating audio equipment are combined into "Audio setting", and the words sharing the common function of operating a search condition are combined into "Search condition setting". Also, the vocabulary group use frequency data 26 "0.85" are stored so as to correspond to the vocabulary group 25 "Destination set". The vocabulary group use frequency data 26 "0.50" are stored so as to correspond to the vocabulary group 25 "Audio setting". The vocabulary group use frequency data 26 "0.24" are stored so as to correspond to the vocabulary group 25 "Search condition setting". Then, "0.80" is stored as the threshold 27.

Thus, the recognition target word extracting unit 12a extracts the vocabulary group use frequency data 26 that are larger than the threshold 27 "0.80". Here, the vocabulary group use frequency data "0.85" corresponding to the vocabulary group 25 "Destination set" apply. Therefore, the recognition target word extracting unit 12a extracts all the words belonging to the vocabulary group 25 "Destination set" as the recognition target words regardless of the scale information 20. Also, the recognition target word extracting unit 12a extracts the vocabulary group use frequency data 26 that are smaller than the threshold 27 "0.80". Here, the vocabulary group use frequency data "0.50" corresponding to the vocabulary group 25 "Audio setting" and the vocabulary group use frequency data "0.24" corresponding to the vocabulary group 25 "Search condition setting" apply. Therefore, the recognition target word extracting unit 12a extracts the recognition target words from the words belonging to the vocabulary groups 25 "Audio setting" and "Search condition setting" based on the scale information 20. More specifically, the recognition target word extracting unit 12a extracts the words whose scale information 20 corresponds to "1" from the words belonging to the vocabulary group 25 as the recognition target words.

(Exemplary Operation of Voice Recognition Apparatus)

Figure 14:
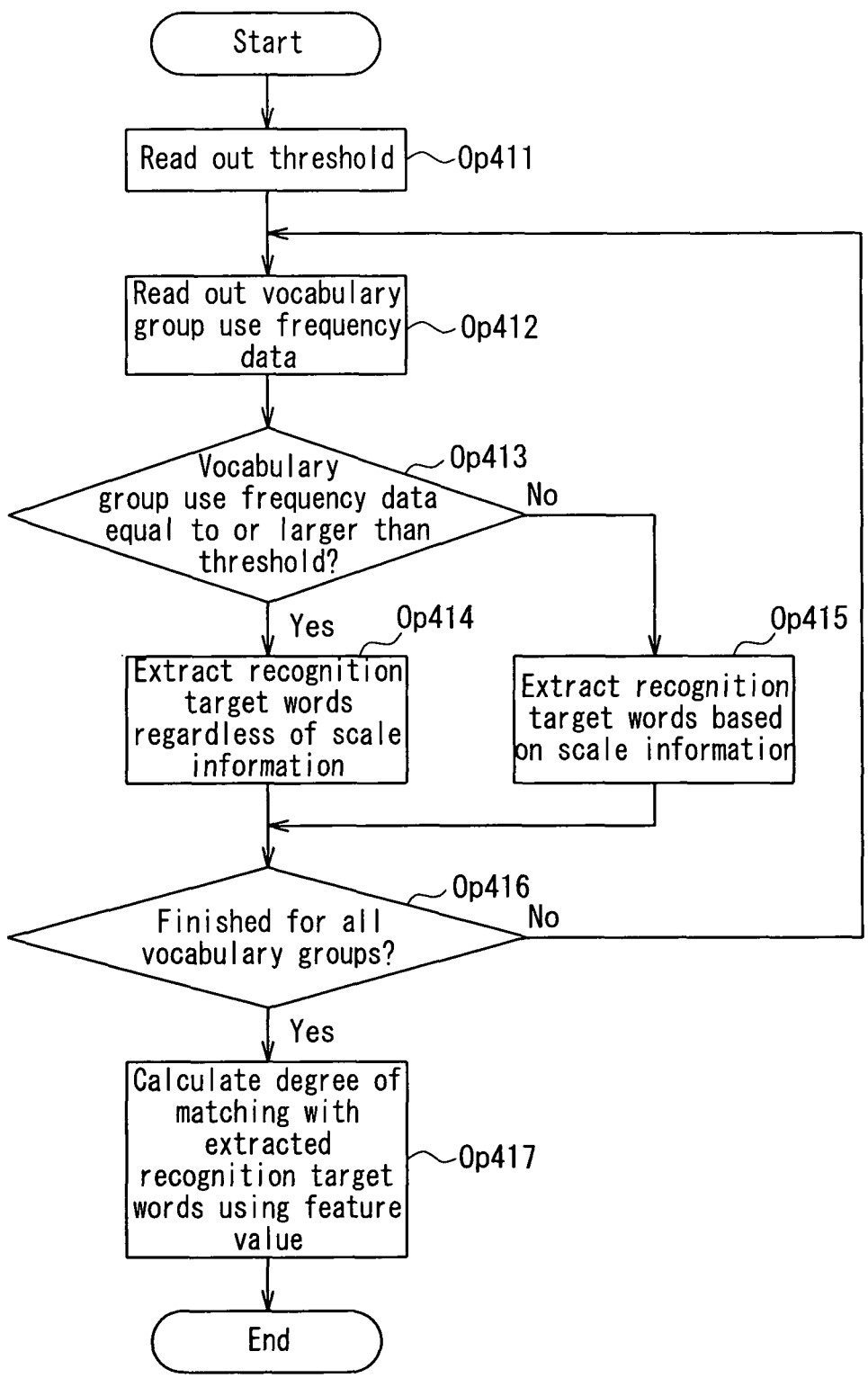
FIG. 14 is a flowchart showing an operation of a matching processing in the above-noted voice recognition apparatus.

In the configuration described above, the operation of the matching processing of the voice recognition apparatus 50 according to the present embodiment will be detailed with reference to FIG. 14. In other words, as shown in FIG. 14, the recognition target word extracting unit 12a reads out (refers to) the threshold 27 stored in the threshold storing unit 53 (Op411). The recognition target word extracting unit 12a reads out the threshold 27 according to the extraction criterion information 24. In the present embodiment, when the extraction criterion information 24 is "0", the recognition target word extracting unit 12a reads out the threshold 27. Next, the recognition target word extracting unit 12a reads out the vocabulary group use frequency data 26 stored in the vocabulary group use frequency storing unit 52 (Op412). Then, if the vocabulary group use frequency data 26 are equal to or larger than the threshold 27 (YES in Op413), the recognition target word extracting unit 12a extracts all the words belonging to the vocabulary group 25 as the recognition target words regardless of the scale information 20 (Op414). On the other hand, if the vocabulary group use frequency data 26 are smaller than the threshold 27 in Op413 (NO in Op413), the recognition target word extracting unit 12a extracts the recognition target words from the words belonging to the vocabulary group 25 based on the scale information 20 (Op415). Then, when the extraction of the recognition target words is finished for all the vocabulary groups 25 (YES in Op416), the matching unit 13 calculates the degree of matching with the recognition target words extracted in Op414 or Op415 using the calculated feature value (Op417). On the other hand, when the extraction of the recognition target words is not finished for all the vocabulary groups 25 in Op416 (NO in Op416), the operation returns to Op412, and the recognition target word extracting unit 12a reads out the use frequency data 26 of the vocabulary group from which the recognition target words are to be extracted next.

Now, referring to FIG. 15, the operation in which the threshold managing unit 12d updates the threshold 27 will be described. Incidentally, the threshold managing unit 12d updates the threshold 27 suitably at the timing when the first updating signal or the second updating signal is inputted from the monitor control unit 15.

Figure 15:
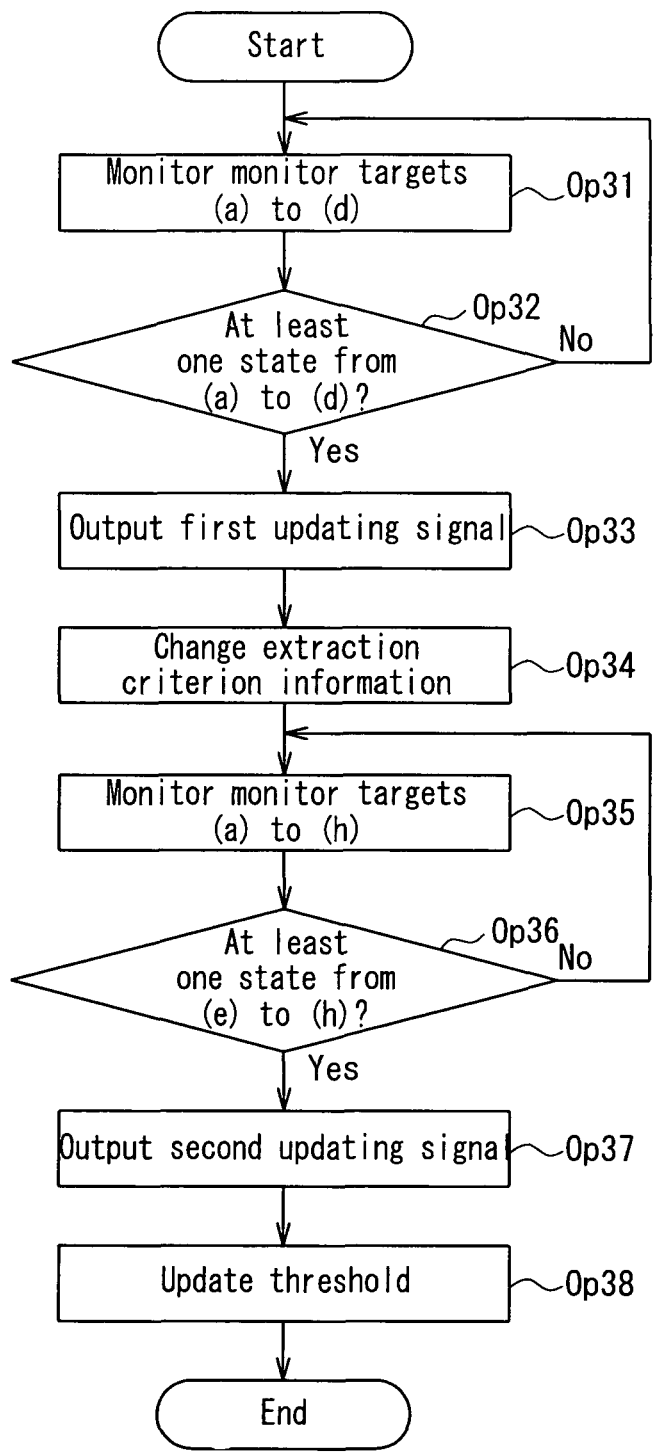
FIG. 15 is a flowchart showing an operation in which a threshold managing unit in the above-noted voice recognition apparatus updates a threshold.

As shown in FIG. 15, the monitor control unit 15 monitors (a) to (d) described above as the monitor targets (Op31). If the monitor control unit 15 detects at least one state from (a) to (d) described above (YES in Op32), it outputs the first updating signal to the threshold managing unit 12d (Op33). On the other hand, if the monitor control unit 15 does not detect at least one state from (a) to (d) described above in Op32 (NO in Op32), the operation returns to Op31, and the monitor control unit 15 monitors the monitor targets (a) to (d) described above. When the first updating signal is inputted, the threshold managing unit 12d updates the threshold 27 (Op34). For example, the threshold managing unit 12d updates the threshold 27 so as to become smaller.

Then, after outputting the first updating signal to the threshold managing unit 12d, the monitor control unit 15 also monitors (e) to (h) described above as the monitor targets in addition to the monitor targets (a) to (d) described above. In other words, the monitor control unit 15 monitors (a) to (h) described above as the monitor targets (Op35). If the monitor control unit 15 detects at least one state from (e) to (h) described above (YES in Op36), it outputs the second updating signal to the threshold managing unit 12d (Op37). On the other hand, if the monitor control unit 15 does not detect at least one state from (e) to (h) described above in Op36 (NO in Op36), the operation returns to Op35, and the monitor control unit 15 monitors the monitor targets (a) to (h) described above. When the second updating signal is inputted, the threshold managing unit 12d updates the threshold 27 (Op38). For example, the threshold managing unit 12d updates the threshold 27 so as to become larger. Although not shown in the figure, if the monitor control unit 15 detects at least one state from (a) to (d) described above in Op36, the operation returns to Op33, and the monitor control unit 15 outputs the first updating signal to the threshold managing unit 12d again. Then, the threshold managing unit 12d updates the threshold 27 so as to become still smaller.

As described above, in the voice recognition apparatus 50 according to the present embodiment, with reference to the threshold 27 and the vocabulary group use frequency data 26, the recognition target word extracting unit 12a selectively performs one of the following operations: for the vocabulary group 25 whose vocabulary group use frequency data 26 are larger than the threshold 27, the operation of extracting all the words belonging to this vocabulary group 25 as the recognition target words regardless of the scale information 20; and for the vocabulary group 25 whose vocabulary group use frequency data 26 are smaller than the threshold 27, the operation of extracting the recognition target words from the words belonging to this vocabulary group 25 based on the scale information 20. Thus, for the vocabulary group 25 whose vocabulary group use frequency data 26 are larger than the threshold 27, the matching unit 13 performs the matching processing according to the recognition target words targeting for recognition all the words belonging to this vocabulary group 25. Therefore, since all the words belonging to the vocabulary groups 25 used with a high frequency are used as the recognition target words, for example, the number of the recognition target words in the voice recognition apparatus 50 regarding these vocabulary groups 25 increases, thereby improving the degree of freedom of a speech. Also, for the vocabulary group 25 whose vocabulary group use frequency data 26 are smaller than the threshold 27, the matching unit 13 performs the matching processing according to the recognition target words extracted from the words belonging to the vocabulary group 25 based on the scale information 20. Therefore, since the words belonging to the vocabulary groups 25 used with a low frequency are used as the recognition target words extracted based on the scale information 20, for example, the number of the recognition target words in the voice recognition apparatus 50 regarding these vocabulary groups 25 is restricted, thereby improving a recognition rate and a recognition speed. As a result, it is possible to achieve the voice recognition apparatus 50 in which a recognition performance improves without the need for a user to carry out a troublesome operation.

Although the present embodiment has illustrated the example in which the threshold managing unit updates the threshold, there is no particular limitation to this. In other words, at the time of initial setting of the voice recognition apparatus, a system administrator may set the threshold. Also, even when the voice recognition apparatus is running, a system administrator or a user may update the threshold.

As described above, the present invention is useful as a voice recognition apparatus and a recording medium recording a voice recognition program in which the recognition performance improves without the need for a user to carry out a troublesome operation.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A voice recognition apparatus comprising:
   a voice input unit for converting an accepted voice into digital voice data;
   a voice analyzing unit for converting the digital voice data into a feature value;
   a vocabulary dictionary storing unit for storing a plurality of words in advance;
   a vocabulary dictionary managing unit for extracting recognition target words, which are targeted for recognition, from the plurality of words stored in the vocabulary dictionary storing unit;
   a matching unit for calculating a degree of matching with the recognition target words extracted by the vocabulary dictionary managing unit using the feature value converted by the voice analyzing unit; and
   a result output unit for outputting, as a recognition result, a word having a best score from a result of calculating the degree of matching by the matching unit;
   wherein the voice recognition apparatus comprises
   a scale information storing unit for storing in advance scale information serving as a scale for extracting the recognition target words for each of the plurality of words stored in the vocabulary dictionary storing unit,
   an extraction criterion information storing unit for storing in advance extraction criterion information for deciding whether the vocabulary dictionary managing unit uses or not the scale information at the time of extracting the recognition target words,
   a monitor control unit for monitoring processing states of at least one of the voice input unit, the matching unit and the result output unit, and for outputting an update signal when detecting a given processing state of at least one of the voice input unit, the matching unit and the result output unit,
   an extraction criterion information managing unit for changing the extraction criterion information stored in the extraction criterion information storing unit based on the update signal according to the detected processing state of at least one of the voice input unit, the matching unit and the result output unit from the monitor control unit, and
   the monitor control unit further monitors an operation accepted from a user and a measurement unit for measuring a time and outputs the update signal based on at least one of the recognition result of the result output unit, the modification, by the user, of the operation or the input voice, an interval between the voice inputs or the operations by the user and a number of calculating the degree of matching by the matching unit,
   with the change in the extraction criterion information, the vocabulary dictionary managing unit switches using or not using the scale information for extracting the recognition target words, thereby increases or decreases the number of the recognition target words to be extracted from the plurality of words stored in the vocabulary dictionary storing unit.

2. The voice recognition apparatus according to claim 1, wherein the monitor control unit monitors at least one monitor target from a processing state of an operation accepted from a user, a processing state of the voice accepted from the user and a predetermined time passed from a measurement unit for measuring a time,
   the vocabulary dictionary managing unit increases or decreases the number of the recognition target words to be extracted from the plurality of words stored in the vocabulary dictionary storing unit according to the changed extraction criterion information, and
   the matching unit calculates the degree of matching with the recognition target words increased or decreased in number using the feature value converted by the voice analyzing unit.

3. The voice recognition apparatus according to claim 2, wherein the monitor control unit monitors at least one monitor target from (a) to (h) below,
   when the monitor control unit detects a state of (a) to (d) below, it transmits a first updating signal to the extraction criterion information managing unit, and the extraction criterion information managing unit changes the extraction criterion information stored in the extraction criterion information storing unit based on the first updating signal so that the number of the recognition target words to be extracted from the plurality of words stored in the vocabulary dictionary storing unit increases, and
   after transmitting the first updating signal to the extraction criterion information managing unit, when the monitor control unit detects a state of (e) to (h) below, it transmits a second updating signal to the extraction criterion information managing unit, and the extraction criterion information managing unit changes the extraction criterion information stored in the extraction criterion information storing unit based on the second updating signal so that the number of the recognition target words to be extracted from the plurality of words stored in the vocabulary dictionary storing unit decreases:

(a) in a case where the recognition result cannot be obtained,
(b) in a case where the user conducts an operation or makes a speech so as to modify or correct an operation or a speech immediately before it,
(c) in a case where the user does not conduct a confirmation operation even after a predetermined period despite a fact that the confirmation operation of a processing is necessary,
(d) in a case where no operation is conducted or no speech is made for a predetermined period,
(e) in a case where the matching unit calculates the degree of matching predetermined times,
(f) in a case where a predetermined time is passed,
(g) in a case where the user conducts a confirmation operation within a predetermined period when the confirmation operation of the processing is necessary,
(h) in a case where the user does not conduct the operation or does not make the speech so as to modify or correct the operation or the speech immediately before it.

4. The voice recognition apparatus according to claim 2, wherein the vocabulary dictionary managing unit selectively performs one of operations (1) and (2) below according to the extraction criterion information stored in the extraction criterion information storing unit:
(1) the vocabulary dictionary managing unit extracts the recognition target words based on the scale information,
(2) the vocabulary dictionary managing unit extracts all the words stored in the vocabulary dictionary storing unit as the recognition target words regardless of the scale information.

5. The voice recognition apparatus according to claim 1, further comprising
a use frequency managing unit for monitoring the number of uses of each of the plurality of words stored in the vocabulary dictionary storing unit and calculating a use frequency of each of the plurality of words,
a use frequency storing unit for storing, as use frequency data, the use frequency calculated by the use frequency managing unit so as to correspond to each of the plurality of . words stored in the vocabulary dictionary storing unit, and
a scale information managing unit for updating the scale information stored in the scale information storing unit using at least the use frequency data stored in the use frequency storing unit.

6. The voice recognition apparatus according to claim 5, further comprising a statistical data obtaining unit for obtaining statistical data regarding the plurality of words from a statistical data storage device storing the statistical data,
wherein the scale information managing unit updates the scale information stored in the scale information storing unit using the use frequency data stored in the use frequency storing unit and the statistical data obtained by the statistical data obtaining unit.

7. The voice recognition apparatus according to claim 5, further comprising
a vocabulary group use frequency managing unit for dividing the plurality of words stored in the vocabulary dictionary storing unit into a plurality of vocabulary groups and calculating a use frequency of each of the vocabulary groups based on the use frequency of each of the plurality of words belonging to the vocabulary group stored in the vocabulary dictionary storing unit,
a vocabulary group use frequency storing unit for storing, as vocabulary group use frequency data, the use frequency of the vocabulary group calculated by the vocabulary group use frequency managing unit so as to correspond to each of the vocabulary groups, and
a threshold storing unit for storing a threshold indicating a criterion of the vocabulary group use frequency data at the time of extracting the recognition target words,
wherein the vocabulary dictionary managing unit selectively performs one of operations (3) and (4) below referring to the threshold stored in the threshold storing unit and the vocabulary group use frequency data stored in the vocabulary group use frequency storing unit according to the extraction criterion information stored in the extraction criterion information storing unit:
(3) for the vocabulary group whose vocabulary group use frequency data are equal to or larger than the threshold, the vocabulary dictionary managing unit extracts all the words belonging to this vocabulary group as the recognition target words regardless of the scale information,
(4) for the vocabulary group whose vocabulary group use frequency data are smaller than the threshold, the vocabulary dictionary managing unit extracts the recognition target words from the words belonging to this vocabulary group based on the scale information.

8. The voice recognition apparatus according to claim 7, wherein the monitor control unit monitors at least one monitor target from a processing state of an operation accepted from a user, a processing state of the voice accepted from the user and a predetermined time passed from a measurement unit for measuring a time,
the voice recognition apparatus further comprises a threshold managing unit for updating the threshold stored in the threshold storing unit according to the result of the monitoring by the monitor control unit, and
the vocabulary dictionary managing unit selectively performs one of the operations (3) and (4) above according to the updated threshold.

9. The voice recognition apparatus according to claim 8, wherein the monitor control unit monitors at least one monitor target from (a) to (h) below,
when the monitor control unit detects a state of (a) to (d) below, it transmits a first updating signal to the threshold managing unit, and the threshold managing unit updates the threshold stored in the threshold storing unit so as to become smaller based on the first updating signal, and
after transmitting the first updating signal to the threshold managing unit, when the monitor control unit detects a state of (e) to (h) below, it transmits a second updating signal to the threshold managing unit, and the threshold managing unit updates the threshold stored in the threshold storing unit so as to become larger based on the second updating signal:
(a) in a case where the recognition result cannot be obtained,
(b) in a case where the user conducts an operation or makes a speech so as to modify or correct an operation or a speech immediately before it,
(c) in a case where the user does not conduct a confirmation operation even after a predetermined period despite a fact that the confirmation operation of a processing is necessary,
(d) in a case where no operation is conducted or no speech is made for a predetermined period,
(e) in a case where the matching unit calculates the degree of matching predetermined times,
(f) in a case where a predetermined time is passed,
(g) in a case where the user conducts a confirmation operation within a predetermined period when the confirmation operation of the processing is necessary, (h) in a case where the user does not conduct an operation or does not make a speech so as to modify or correct the operation or the speech immediately before it.

10. The voice recognition apparatus according to claim 1, further comprising a voice storing unit for storing the digital voice data converted by the voice input unit or the feature value converted by the voice analyzing unit, wherein the matching unit calculates the degree of matching with the recognition target words extracted by the vocabulary dictionary managing unit using the digital voice data or the feature value stored in the voice storing unit.

11. The voice recognition apparatus according to claim 10, wherein when the matching unit calculates the degree of matching with the recognition target words extracted by the vocabulary dictionary managing unit using the digital voice data or the feature value stored in the voice storing unit, the vocabulary dictionary managing unit excludes the words extracted as the recognition target words immediately before that and extracts the recognition target words from the plurality of words stored in the vocabulary dictionary storing unit.

12. A non-transitory recording medium storing a voice recognition program causing a computer to execute a voice input operation of converting an accepted voice into digital voice data;

a voice analyzing operation of converting the digital voice data into a feature value;

a vocabulary dictionary managing operation of extracting recognition target words, which are targeted for recognition, from a vocabulary dictionary storing unit storing a plurality of words in advance;

a matching operation of calculating a degree of matching with the recognition target words extracted in the vocabulary dictionary managing operation using the feature value converted in the voice analyzing operation; and a result output operation of outputting, as a recognition result, a word having a best score from a result of calculating the degree of matching in the matching operation;

wherein the vocabulary dictionary managing operation causes a computer to execute an operation of referring to scale information serving as a scale for extracting the recognition target words stored in advance in a scale information storing unit and referring to extraction criterion information for deciding whether the scale information is used or is not used at the time of extracting the recognition target words stored in advance in an extraction criterion information storing unit, and causes a computer to execute a monitor control operation of monitoring processing states of at least one of the voice input operation, the matching operation and the result output operation, and outputting an update signal when detecting a given processing state of at least one of the voice input operation, the matching operation and the result output operation, an extraction criterion information managing operation of changing the extraction criterion information stored in the extraction criterion information storing unit based on the update signal according to the detected processing state of at least one of the voice input operation, the matching operation and the result output operation in the monitor control operation, and the monitor control operation further includes monitoring an user operation accepted from a user and a measurement operation by the computer for measuring a time and outputting the update signal based on at least one of the recognition result of the result output operation, the modification by the user, of the user operation or the input voice, an interval between the voice inputs or the user operations by the user and a number of calculating the degree of matching by the matching operation, with the change in the extraction criterion information, the vocabulary dictionary managing operation causes a computer to switch between the operation of the extracting the recognition target words by using the scale information and the operation of the extracting the recognition target word without using the scale information, thereby execute an operation of increasing or decreasing the number of the recognition target words to be extracted from the plurality of words stored in the vocabulary dictionary storing unit.

* * * * *